US006375910B1

(12) United States Patent
Deeba et al.

(10) Patent No.: US 6,375,910 B1
(45) Date of Patent: Apr. 23, 2002

(54) MULTI-ZONED CATALYTIC TRAP AND METHODS OF MAKING AND USING THE SAME

(75) Inventors: Michel Deeba, East Brunswick, NJ (US); Uwe Dahle, Garbsen; Stefan Brandt, Braunschweig, both of (DE)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/527,910

(22) Filed: Mar. 17, 2000

Related U.S. Application Data

(63) Continuation-in-part of application No. 09/378,813, filed on Aug. 23, 1999, now abandoned, which is a continuation-in-part of application No. 09/323,658, filed on Jun. 1, 1999.
(60) Provisional application No. 60/127,489, filed on Apr. 2, 1999.

(51) Int. Cl.[7] ........................ B01D 53/94; B01J 23/40; B01J 23/58; B01J 37/02; F01N 3/28

(52) U.S. Cl. ................. 423/239.1; 422/171; 422/177; 422/180; 423/213.2; 423/213.5; 423/213.7; 502/304; 502/339; 502/340; 502/439; 60/297

(58) Field of Search ................. 422/170, 171, 422/177, 180; 60/297, 299; 502/439, 304, 339, 340, 333; 423/239.1, 213.2, 213.5, 213.7

(56) References Cited

U.S. PATENT DOCUMENTS

| 4,345,430 A | 8/1982 | Pallo et al. ............... 60/282 |
| 4,550,034 A | 10/1985 | Shimrock et al. .......... 427/243 |
| 5,139,994 A | 8/1992 | Chattha et al. ............. 502/334 |

(List continued on next page.)

FOREIGN PATENT DOCUMENTS

| EP | 664147 | * 7/1995 | |
| EP | 1 066 874 A1 | 1/2001 | ........... B01D/53/94 |
| WO | WO 92/09848 | 6/1992 | ........... F23D/14/00 |
| WO | WO 98/45026 | 10/1998 | ........... B01D/53/94 |
| WO | WO 00/59611 | 10/2000 | ........... B01D/53/94 |

*Primary Examiner*—Hien Tran
(74) *Attorney, Agent, or Firm*—Richard A. Negin

(57) ABSTRACT

A multi-zoned catalytic trap for conversion of $NO_x$ in an exhaust gas stream which emanates from an engine which is operated with periodic alternations between lean, and stoichiometric or rich, conditions. The catalytic trap comprises a first zone, a second zone and, optionally, one or more intermediate zones disposed between the first zone and the second zone. Each of the zones comprises a catalytic trap material coated on a refractory carrier member. In the first zone, the catalytic trap material comprises a refractory metal oxide support having dispersed thereon a palladium catalytic component in the amount of about 30 to about 300 $g/ft^3$, a platinum catalytic component in the amount of 0 to about 100 $g/ft^3$ and a rhodium catalytic component in the amount of 0 to about 10 $g/ft^3$; and a $NO_x$ sorbent comprising one or more basic oxygenated compounds of one or more alkaline earth metals and optionally, one or more basic oxygenated compounds of one or more alkali metals. In the second zone, the catalytic trap material comprises a refractory metal oxide support having dispersed thereon a palladium catalytic component in the amount of 0 to about 50 $g/ft^3$, a platinum catalytic component in the amount of about 10 to about 100 $g/ft^3$ and a rhodium catalytic component in the amount of about 5 to about 20 $g/ft^3$; and a $NO_x$ sorbent comprising one or more basic oxygenated compounds of one or metals selected from the group consisting of alkali metals and alkaline earth metals. In the optional zone(s), the catalytic trap material comprises a refractory metal oxide support having dispersed thereon a palladium catalytic component in the amount of about 25 to about 75 $g/ft^3$, a platinum catalytic component in the amount of about 5 to about 30 $g/ft^3$ and a rhodium catalytic component in the amount of 0 to about 10 $g/ft^3$; and a $NO_x$ sorbent comprising one or more basic oxygenated compounds of one or metals selected from the group consisting of alkali metals and alkaline earth metals.

76 Claims, 5 Drawing Sheets

U.S. PATENT DOCUMENTS

| | | | |
|---|---|---|---|
| 5,154,894 A | 10/1992 | MacFarlane et al. | 422/180 |
| 5,179,059 A | 1/1993 | Domesle et al. | 502/303 |
| 5,258,349 A | 11/1993 | Dalla Betta et al. | 502/330 |
| 5,473,887 A | 12/1995 | Takeshima et al. | 60/276 |
| 5,510,086 A | 4/1996 | Hemingway et al. | 422/171 |
| 5,597,771 A | 1/1997 | Hu et al. | 502/304 |
| 5,776,423 A | 7/1998 | Feeley et al. | 423/239.2 |
| 5,792,436 A | 8/1998 | Feeley et al. | 423/210 |
| 5,866,210 A | 2/1999 | Rosynsky et al. | 427/294 |
| 5,874,057 A | 2/1999 | Deeba et al. | 423/239.1 |
| 5,878,567 A | 3/1999 | Adamczyk, Jr. et al. | 60/274 |
| 5,910,293 A | 6/1999 | Hemingway et al. | 423/213.7 |
| 5,958,826 A | 9/1999 | Kurokawa et al. | |

\* cited by examiner

MULTI-ZONED CATALYTIC TRAP AND METHODS OF MAKING AND USING THE SAME

CROSS REFERENCE TO RELATED APPLICATION

This application is a continuation-in-part of patent application Ser. No. 09/378,813 of Michel Deeba et al. entitled Catalytic Trap with Potassium Component and Method of Using the Same, filed on Aug. 23, 1999, now abandoned which in turn is a continuation-in-part of patent application Ser. No. 09/323,658 of Michel Deeba et al. entitled Catalytic Trap and Methods of Making and Using the Same, filed on Jun. 1, 1999 which claims benefit to Provisional Application 60/127,489 filed Apr. 2, 1999.

BACKGROUND OF THE INVENTION

1. Field of the Invention

The present invention relates to a multi-zoned catalytic trap for treating exhaust gas streams, especially those emanating from lean-burn engines, and to methods of making and using the same. More specifically, the present invention provides a multizoned catalytic trap which abates $NO_x$, CO and hydrocarbons in the exhaust streams being treated at initial engine start-up conditions as well as at subsequent high engine temperature conditions and exhibits enhanced durability after aging at high temperature and lean operation conditions.

2. Related Art

Emission of nitrogen oxides ("$NO_x$") from lean-burn engines (described below) must be reduced in order to meet emission regulation standards. Conventional three-way conversion ("TWC") automotive catalysts are suitable for abating $NO_x$, carbon monoxide ("CO") and hydrocarbon ("HC") pollutants in the exhaust of engines operated at or near stoichiometric air/fuel conditions. The precise proportion of air to fuel that results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol X is thus used to represent the result of dividing a particular A/F ratio by the stoichiometric A/F ratio for a given fuel, so that $\lambda=1$ is a stoichiometric mixture, $\lambda>1$ is a fuel-lean mixture and $\lambda$ is a fuel-rich mixture.

Engines, especially gasoline-fueled engines to be used for passenger automobiles and the like, are being designed to operate under lean conditions as a fuel economy measure. Such future engines are referred to as "lean-burn engines." That is, the ratio of air to fuel in the combustion mixtures supplied to such engines is maintained considerably above the stoichiometric ratio (e.g., at an air-to-fuel weight ratio of 18:1) so that the resulting exhaust gases are "lean," i.e., the exhaust gases are relatively high in oxygen content. Although lean-burn engines provide enhanced fuel economy, they have the disadvantage that conventional TWC catalysts are not effective for reducing $NO_x$ emissions from such engines because of excessive oxygen in the exhaust. The prior art discloses attempts to overcome this problem by operating lean-burn engines with brief periods of fuel-rich operation (engines which operate in this fashion are sometimes referred to as "partial lean-burn engines.") It is known to treat the exhaust of such engines with a catalyst/$NO_x$ sorbent which stores $NO_x$ during periods of lean (oxygen-rich) operation, and releases the stored $NO_x$ during the rich (fuel-rich) periods of operation. During periods of rich operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO and/or hydrogen present in the exhaust.

The use of $NO_x$ storage (sorbent) components including alkaline earth metal oxides, such as oxides of Ca, Sr and Ba, alkali metal oxides such as oxides of K, Na, Li and Cs, and rare earth metal oxides such as oxides of Ce, La, Pr and Nd in combination with precious metal catalysts such as platinum dispersed on an alumina support, is known, as shown for example, at column 4, lines 19–25, of U.S. Pat. No. 5,473,887 of S. Takeshima et al., issued on Dec. 12, 1995. At column 4, lines 53–57, an exemplary composition is described as containing barium (an alkaline earth metal) and a platinum catalyst. The publication Environmental Catalysts For A Better World And Life, Proceedings of the 1$^{st}$ World Congress at Pisa, Italy, May 1–5, 1995, published by the Societa Chimica Italiana of Rome, Italy has, at pages 4548 of the publication, an article entitled "The New Concept 3-Way Catalyst For Automotive Lean-Burn Engine Storage and Reduction Catalyst," by Takahashi et al. (below referred to as "the Takahashi et al. Paper"). This article discloses the preparation of catalysts of the type described in the aforementioned Takeshima et al. U.S. Pat. No. 5,473,887 and using these catalysts for $NO_x$ purification of actual and simulated exhaust gases alternately under oxidizing (lean) and reducing (rich or stoichiometric) conditions. The conclusion is drawn in the last sentence on page 46 that $NO_x$ was stored in the catalyst under oxidizing conditions and that the stored $NO_x$ was then reduced to nitrogen under stoichiometric and reducing conditions. A similar but more detailed discussion is contained in SAE Paper 950809 published by the Society of Automotive Engineers, Inc., Warrendale, Pa., and entitled Development of new Concept Three-Way Catalyst for Automotive Lean-Burn Engines, by Naoto Miyoshi et al., was delivered at the International Congress and Exposition, Detroit, Mich., Feb. 27–Mar. 2, 1995.

U.S. Pat. No. 4,742,038, "Monolithic Catalyst Support and Catalyst Deposited on the Support," issued May 3, 1988 to S. Matsumoto, discloses a metal substrate for carrying a catalytic material useful for the treatment of exhaust gases from internal combustion engines. U.S. Pat. No. 5,874,057, "Lean $NO_x$ Catalyst/Trap Method," issued on Feb. 23, 1999 to M. Deeba et al., discloses a method of $NO_x$ abatement utilizing a composition comprising a $NO_x$ abatement catalyst comprising platinum and, optionally, at least one other platinum group metal catalyst which is kept segregated from a $NO_x$ sorbent material. The $NO_x$ sorbent material may be one or more of oxides, carbonates, hydroxides and mixed oxides of one or more of lithium, sodium, potassium, rubidium, osmium, magnesium, calcium, strontium and barium.

Prior art catalysts as described above have a problem in practical application, particularly when the catalysts are aged by exposure to high temperatures and lean operating conditions, because after such exposure, such catalysts show a marked decrease in catalytic activity for $NO_x$ reduction, particularly at low temperature (250 to 350C) and high temperature (450 to 600C) operating conditions.

U.S. Pat. No. 5,451,558, "Process For the Reaction and Absorption of Gaseous Air Pollutants, Apparatus Therefor and Method of Making the Same," issued on Sep. 19, 1995 to L. Campbell et al., ("the Campbell et al.. Patent") discloses a catalytic material for the reduction of $NO_x$ from a turbine in a power generating stack, although the patent also refers at column 1, lines 13–14, generally to a process and apparatus for reducing pollutants "which are produced by combustion of hydrocarbons or hydrogen in an engine or boiler, and primarily in a gas turbine." As disclosed at column 2, lines 23–37, the turbine exhaust gases are cooled to the range of 250 to 500F (about 121 to 260C) before contacting the catalytic/adsorbent material (column 2, lines 23–37) and the oxidation is stated (column 2, lines 45–48) to occur at temperatures in the range of 150 to about 425F (66 to 218C), most preferably in the range of 175 to 400F (about 79 to 204C). The catalytic species comprises an oxidation catalyst species which may comprise various metals including platinum group metals (see column 3, line 67 through column 4, line 3) deposited on a high surface area support which may be "made of alumina, zirconia, titania, silica or a combination of two or more of these oxides." The catalyst-containing high surface area support is coated with an adsorbent species which may comprise "at least one alkali or alkaline earth compound, which can be a hydroxide compound, bicarbonate compound, or carbonate compound, or mixtures thereof." At column 3, lines 16–22, the "carbonate coating" is said to be a "lithium, sodium, potassium or calcium carbonate, and presently the preferred coating is a potassium carbonate." At column 4, lines 28–31, however, it is stated that the absorber comprises "most preferably sodium carbonate, potassium carbonate or calcium carbonate." The high surface area support containing the oxidation species and adsorbent may be coated onto "a ceramic or metal matrix structure" as a carrier (see column 4, lines 12–20). The catalytic material is applied to the carrier by coating the carrier with, e.g., platinum-impregnated alumina, and then wetting the alumina with an alkali or alkaline earth carbonate solution, and then drying the wetted alumina (see column 5, line 9 through column 6, line 12). The carriers may be alumina beads as illustrated in FIG. 1A, or a monolithic ceramic or stainless steel support as illustrated in FIG. 1C, both Figures being described at column 4, line 67, to column 5, line 8. The use of a metal monolith support for the catalytic/adsorbent material is suggested at column 5, lines 48–58. There is no suggestion in the Campbell et al. patent of criticality of, nor is any importance assigned to, the type of substrate or high surface area support to be used with a particular adsorbent species. In fact, as noted above, silica is one of four high surface area supports taught for use with compositions preferably including a potassium carbonate adsorbent.

SUMMARY OF THE INVENTION

The invention relates to a multi-zoned catalytic trap for conversion of $NO_x$ in an exhaust gas stream which emanates from an engine which is operated with periodic alternations between lean, and stoichiometric or rich, conditions. The multi-zoned catalytic trap comprising a first zone, a second zone and, optionally, one or more intermediate zones disposed between the first zone and the second zone. The fabrication of the catalytic trap in the form of such zones results in a trap which maintains high catalytic activity for $NO_x$ reduction at partial lean burn conditions, particularly at low temperature (250 to 350C) as well as high temperature (450 to 600C) operating conditions, without sacrificing catalytic activity in respect to removal of unburned hydrocarbons and carbon monoxide present in the exhaust gas stream. Moreover, the multi-zoned catalytic traps of the invention maintain their catalytic activity even after the traps are aged by exposure to high temperatures and lean operating conditions

DETAILED DESCRIPTION OF THE INVENTION

Figure 1:
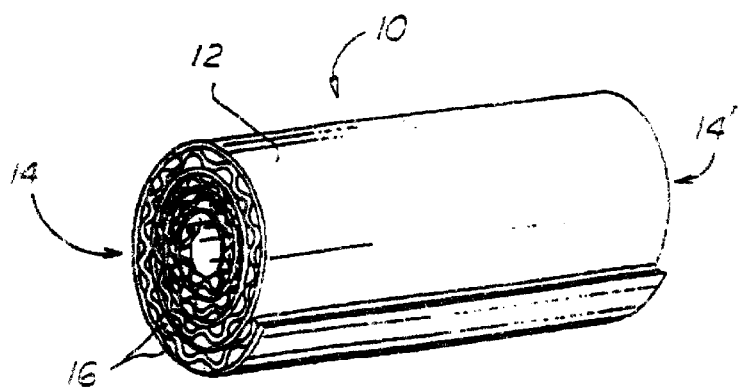
FIG. 1 is a perspective view of a typical zone of the multi-zoned catalytic trap of the invention comprising a single honeycomb-type refractory carrier member

The reduction of $NO_x$ from the exhaust of lean-burn engines, such as gasoline direct injection and partial lean-burn engines, as well as from diesel engines, requires trapping of $NO_x$ at lean engine operating conditions and releasing and reducing the $NO_x$ at stoichiometric or rich engine operating conditions. The lean operating cycle is typically between 1 and 3 minutes and the rich operating cycle should be small enough (1 to 5 seconds) to preserve as much as possible of the fuel benefit associated with lean-burn engines. A catalytic trap generally must provide a $NO_x$ trap function and a catalyst function, typically a three-way catalyst ("TWC") function.

The first embodiment of the invention pertains to a multi-zoned catalytic trap having a first zone, a second zone and optionally, one or more zones intermediate the first and second zones.

The first zone comprises a first catalytic trap material coated on a refractory carrier member. The first catalytic trap material comprises:
(a) a refractory metal oxide support having dispersed thereon a palladium catalytic component in the amount of about 30 to about 300 g/ft$^3$, a platinum catalytic component in the amount of 0 to about 100 g/ft$^3$ and a rhodium catalytic component in the amount of 0 to about 10 g/ft$^3$; and
(b) a $NO_x$ sorbent comprising one or more basic oxygenated compounds of one or more alkaline earth metals and optionally, one or more basic oxygenated compounds of one or more alkali metals.

The second zone comprises a second catalytic trap material coated on a refractory carrier member. The second catalytic trap material comprises:
(A) a refractory metal oxide support having dispersed thereon a palladium catalytic component in the amount of 0 to about 50 g/ft$^3$, a platinum catalytic component in the amount of about 10 to about 100 g/ft$^3$ and a rhodium catalytic component in the amount of about 5 to about 20 g/ft$^3$; and
(B) a $NO_x$ sorbent comprising one or more basic oxygenated compounds of one or more metals selected from the group consisting of alkaline earth metals and alkali metals.

The one or more optional intermediate zones comprise one or more optional intermediate catalytic trap materials coated on one or more refractory carrier members. The optional intermediate catalytic trap materials comprise:
(a) a refractory metal oxide support having dispersed thereon a palladium catalytic component in the amount of about 25 to about 75 g/ft$^3$, a platinum catalytic component in the amount of about 5 to about 30 g/ft$^3$ and a rhodium catalytic component in the amount of 0 to about 10 g/ft$^3$; and
(b) a $NO_x$ sorbent comprising one or more basic oxygenated compounds of one or more metals selected from the group consisting of alkaline earth metals and alkali metals.

The $NO_x$ sorbent in the first, second and the optional intermediate zones may be the same or different compound in each of the zones. Such compounds will comprise one or more basic oxygenated compounds of an alkaline earth or alkali metal such as lithium, sodium, potassium, cesium, magnesium, calcium, strontium or barium. The basic oxygenated compound includes, without limitation, an oxide, carbonate, hydroxide or mixed metal oxide) of one or more of the foregoing metals. The mixed oxides may be, for example, barium zirconate, calcium titanate, barium titanate, magnesium titanate (e.g., $MgOTiO_2$), magnesium alumina titanate (e.g., $MgOAl_2O_3$), etc.

The preferred $NO_x$ sorbent in the first, second and the optional intermediate zones will be one or more basic oxygenated compounds of potassium, cesium, barium, strontium or sodium. Preferably, the $NO_x$ sorbent is present in the first zone, second zone and optional intermediate zones in the total amount of at least about 0.3 g/in3; preferably the $NO_x$ sorbent is present in the first zone, second zone and optional intermediate zones in the total amount of about 0.3 to about 2.5 g/in$^3$.

The $NO_x$ sorbents can be incorporated into the catalytic trap material of the present invention in any suitable manner.

Thus, the $NO_x$ sorbent may be introduced in bulk particle form simply by mixing particles of the $NO_x$ sorbent component with the particles of refractory metal oxide support on which the palladium and/or optional platinum and rhodium catalytic components are dispersed. Alternatively, the $NO_x$ sorbent may be dispersed on its own refractory metal oxide support by impregnating suitable refractory metal oxide particles with a solution of a precursor compound of the $NO_x$ sorbent, drying and heating in air or other oxygen-containing gas (calcining). The resultant supported $NO_x$ sorbent may be incorporated into the washcoat by admixing the particles with the supported catalytic component particles in a slurry to be applied as a washcoat to a carrier member. Alternatively, the supported $NO_x$ sorbent particles may be applied as a separate, discrete layer of the washcoat. Alternatively, and preferably, with respect to attaining finer dispersion of the $NO_x$ sorbent throughout the catalytic trap material, the $NO_x$ sorbent can be dispersed in the washcoat by post-impregnating a palladium and platinum-containing, calcined refractory metal oxide support (which may also contain rhodium catalytic components) with a solution of a soluble precursor compound of the $NO_x$ sorbent metal, e.g., a nitrate or acetate such as cesium nitrate, and then drying and calcining the impregnated support in air (or other oxygen-containing gas) to decompose the impregnated precursor compound to the $NO_x$ sorbent. This technique may advantageously be used by dipping a carrier member having thereon a calcined washcoat containing the palladium and platinum and optional rhodium catalytic components into a solution of one or more precursor compounds of the $NO_x$ sorbent. It will be appreciated that different portions of the $NO_x$ sorbent may be incorporated into the catalytic trap material by different ones of the above techniques. The choice of a particular method of incorporation of the $NO_x$ sorbent may in some cases by dictated by the particular components being utilized.

A typical so-called honeycomb-type carrier member comprises a "brick" of material such as cordierite or the like, having a plurality of fine, gas-flow passages extending therethrough from the front face to the rear face of the carrier member. These fine gas-flow passages, which may number from about 100 to 900 passages or cells per square inch of face area ("cpsi"), have a catalytic trap material coated on the walls thereof.

The multi-zoned catalytic trap material of the present invention may contain other suitable components such as base metal oxide catalytic components, e.g., oxides of one or more of nickel, manganese and iron. Such components are useful at least because of their ability to trap hydrogen sulfide at rich or stoichiometric conditions and, at lean conditions, to promote the oxidation of hydrogen sulfide to sulfur dioxide. The level of released $SO_2$ is relatively small, and in any case, it is less obnoxious than the release of $H_2S$, because of the pungent unpleasant odor of the latter. Such components, when employed, are preferably disposed at the rear or downstream end of the catalytic trap so that the $SO_2$ formed will not contact the entire length of the trap. The $SO_2$ has a tendency to poison the catalyst and, if disposed in the downstream section of the catalytic trap, most of it will be discharged from the catalytic trap and any poisoning of the catalyst will be limited. Preferably, such components are placed within the downstream 20% of the longitudinal length of the catalytic trap (the term "downstream" is used as sensed by the exhaust flowing through the catalytic trap.)

The palladium, platinum and rhodium catalytic components are supported on a suitable refractory metal oxide support, and are prepared by techniques well known in the art, e.g., by impregnating the support with a precursor compound or complex of the catalytic metal.

A typical method of manufacturing a catalytic trap in accordance with the present invention is to provide the catalytic $NO_x$ sorbent as a coating or layer of washcoat on the walls of the gas-flow passages of a suitable refractory carrier member such as a cordierite honeycomb carrier. This may be accomplished, as is well known in the art, by impregnating a fine particulate refractory metal oxide, e.g., activated alumina (high surface area, predominately gamma alumina), with one or more catalytic metal components essentially including palladium and platinum and optionally rhodium, drying and calcining the impregnated activated alumina particles and forming an aqueous slurry of these particles. Particles of a bulk $NO_x$ sorbent may be included in the slurry. Alternatively, the $NO_x$ sorbent may be dispersed into the support, preferably in a post-impregnation operation, as described above. The activated alumina may have initially been thermally stabilized, as is well known in the art, by impregnating it with, for example, a solution of a soluble salt of barium, lanthanum, rare earth metal or other known stabilizer precursor, and calcining the impregnated activated alumina to form a stabilizing metal oxide dispersed onto the alumina. The carrier member may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the $NO_x$ trap component, to the walls of the passages thereof. The carrier may then be immersed into a slurry of fine particles of a basic oxygenated metal compound, for example, in an aqueous slurry of fine particles of bulk strontium oxide, to provide a second or top coating (layer) of a $NO_x$ sorbent deposited over the first or bottom coating of $NO_x$ catalyst. The coated carrier member is then dried and calcined to provide a finished catalyst composition in accordance with one embodiment of the present invention.

Alternatively, the alumina or other support particles impregnated with the catalytic component may be mixed with bulk or supported particles of the $NO_x$ sorbent in an aqueous slurry, and this mixed slurry of catalytic component particles and $NO_x$ sorbent particles may be applied as a coating to the walls of the gas-flow passages of the carrier member. Preferably, however, for improved dispersion of the $NO_x$ sorbent, the washcoat of catalytic component material, after being dried and calcined, is immersed (post-dipped) into a solution of one or more precursor compounds (or complexes) of $NO_x$ sorbent to impregnate the washcoat with the $NO_x$ sorbent precursor. The impregnated washcoat is then dried and calcined to provide the $NO_x$ sorbent dispersed throughout the washcoat.

Separate, discrete layers of washcoat may be applied in successive impregnating/drying/calcining operations, e.g., to provide a bottom washcoat layer containing, e.g., substantially all of the optional platinum catalytic component and a top washcoat layer containing, e.g., substantially all of the palladium catalytic component. Alternatively, substantially all the palladium catalytic component may be contained in the bottom washcoat layer and substantially all the platinum catalytic component may be contained in the top layer. In a third variation, platinum and palladium catalytic components, or portions thereof, may be contained in both the top and bottom layers of washcoat. A rhodium catalytic component may supplement or replace the platinum catalytic component in any of the above combinations. Further, more than two washcoat layers may be provided. The $NO_x$ sorbent may be dispersed by impregnation into, e.g., both the top and bottom layers.

In respect to the first catalytic trap material, the palladium catalytic component is preferably present in the amount of 50 to 200 $g/ft^3$, the platinum catalytic component is preferably present in the amount of 0 to 50 $g/ft^3$ and the rhodium catalytic component is preferably present in the amount of 0 to 10 $g/ft^3$.

In respect to the second catalytic trap material, the palladium catalytic component is preferably present in the amount of 0 to 50 $g/ft^3$, the platinum catalytic component is preferably present in the amount of 30 to 100 $g/ft^3$ and the rhodium catalytic component is preferably present in the amount of 5 to 20 $g/ft^3$.

In respect to the optional intermediate catalytic trap materials, the palladium catalytic component is preferably present in the amount of 30 to 50 $g/ft^3$, the platinum catalytic component is preferably present in the amount of 10 to 20 $g/ft^3$ and the rhodium catalytic component is preferably present in the amount of 0 to 10 $g/ft^3$.

Preferably, the total amount of precious metal in all of the zones of the catalytic trap is such that the total amount of palladium component plus platinum component plus rhodium component is not greater than about 165 $g/ft^3$, preferably not greater than 125 $g/ft^3$.

For the purposes of the present invention, the refractive carrier member on which the first catalytic trap material, the second catalytic trap material and the optional intermediate catalytic trap materials are coated may be the same carrier member or it may be made up of separate corresponding carrier member segments. In the latter case, a segment may be comprised of the same carrier member material as that of an adjacent segment or may be comprised of a different carrier member material.

Desirably, the multi-zoned catalytic trap of the invention is employed in combination with a treatment catalyst disposed upstream of the multi-zoned catalytic rap relative to the exhaust gas stream. The treatment catalyst should be any of those known to be effective to promote under oxidation conditions the oxidation of hydrocarbons to $CO_2$ and $H_2O$.

The refractory carrier may be prepared from any of the materials conventionally used for catalytic traps. Preferably, the refractory carrier as well as the first catalytic trap material, the second catalytic trap material and the optional intermediate catalytic trap materials are substantially free of silica components. Typically, the refractory material may be a refractory metal such as stainless steel, iron/chromium alloy or titanium, or one or more of alumina, titania, zirconia, corundum, aluminum phosphate, zirconium phosphate, zirconium aluminum phosphate or metals incorporating zirconium phosphate or zirconium aluminum phosphate.

The first and/or second and/or optional intermediate zones of the catalytic trap may further comprise one or more components which are independently selected from the group consisting of one or more oxides of nickel, manganese, iron, lanthanum, barium and zirconium.

As a second embodiment of the invention, the first catalytic trap material, second catalytic trap material and optional intermediate catalytic trap materials in the first, second and optional intermediate zones, respectively, are present as a discrete bottom layer and a discrete top layer overlying the bottom layer. When the catalytic trap materials are present in the form of such layers, the bottom layer on which the materials are coated may be the same carrier member or it may be made up of separate corresponding carrier member segments. In the case of separate segments, a segment may be comprised of the same carrier member material as that of an adjacent segment or may be comprised of a different carrier member material. In addition to the palladium catalytic component, the platinum catalytic component, the rhodium catalytic component and the $NO_x$ sorbent, the bottom layer and/or the top layer may also each contain one or more oxides of metals such as nickel, manganese, iron, lanthanum, barium and zirconium.

In the second embodiment, the first catalytic trap material in the top layer preferably comprises a refractory metal oxide support having dispersed thereon a palladium catalytic component and a $NO_x$ sorbent comprising one or more basic oxygenated compounds of one or more alkaline earth metals and optionally, one or more basic oxygenated compounds of one or more alkali metals. Preferably, the first catalytic trap material in the bottom layer comprises a refractory metal oxide support having dispersed thereon a platinum catalytic component, a rhodium catalytic component and a $NO_x$ sorbent comprising one or more basic oxygenated compounds of one or more alkaline earth metals and optionally, one or more basic oxygenated compounds of one or more alkali metals.

In the second embodiment, the palladium catalytic component is preferably present in the top layer in the amount of 50 to 200 $g/ft^3$. In the bottom layer, the platinum catalytic component is preferably present in the amount of 0 to 50 $g/ft^3$ and the rhodium catalytic component is preferably present in the amount of 0 to 10 $g/ft^3$. The $NO_x$ sorbent is preferably present in each of the top and bottom layers in the amount of 0 to 0.45 $g/in^3$ in the case of the $NO_x$ sorbent being one or more basic oxygenated compounds of one or more alkali metals and preferably in the amount of 0.3 to 1.5 $g/in^3$ in the case of the $NO_x$ sorbent being one or more basic oxygenated compounds of one or more alkaline earth metals.

Also in the second embodiment, the second catalytic trap material in the top layer preferably comprises a refractory metal oxide support having dispersed thereon a palladium catalytic component, a platinum catalytic component, a rhodium catalytic component and a $NO_x$ sorbent comprising one or basic oxygenated compounds of one or more metals selected from the group consisting of alkaline earth metals and alkali metals, and the second catalytic trap material in the bottom layer comprises a refractory metal oxide support having dispersed thereon a palladium catalytic component, a platinum catalytic component, a rhodium catalytic component and a $NO_x$ sorbent comprising one or basic oxygenated compounds of one or more metals selected from the group consisting of alkaline earth metals and alkali metals.

Further in the second embodiment, the palladium catalytic component is preferably present in the top layer in the amount of 0 to 50 $g/ft^3$ and is preferably present in the bottom layer in the amount of 0 to 15 $g/ft^3$; the platinum catalytic component is preferably present in the top layer in the amount of 0 to 30 $g/ft^3$ and is preferably present in the bottom layer in the amount of 30 to 60 $g/ft^3$; the rhodium catalytic component is preferably present in the top layer in the amount of 0 to 10 $g/ft^3$ and is preferably present in the bottom layer in the amount of 5 to 10 $g/ft^3$. The $NO_x$ sorbent is preferably present in each of the top and bottom layers in the amount of 0.25 to 1.0 $g/in^3$ in the case of the $NO_x$ sorbent being one or more basic oxygenated compounds of one or more alkali metals and in the amount of 0.2 to 0.6 $g/in^3$ in the case of the $NO_x$ sorbent being one or more basic oxygenated compounds of one or more alkaline earth metals.

Additionally, in the second embodiment, the optional intermediate catalytic trap materials in the top layer preferably comprise a refractory metal oxide support having dispersed thereon a palladium catalytic component, a platinum catalytic component, a rhodium catalytic component and a $NO_x$ sorbent comprising one or basic oxygenated compounds of one or more metals selected from the group consisting of alkaline earth metals and alkali metals, and the optional intermediate catalytic trap materials in the bottom layer comprise a refractory metal oxide support having dispersed thereon a palladium catalytic component, a platinum catalytic component, a rhodium catalytic component and a $NO_x$ sorbent comprising one or basic oxygenated compounds of one or more metals selected from the group consisting of alkaline earth metals and alkali metals.

In respect to the optional intermediate catalytic trap materials, the palladium catalytic component is preferably present in the top layer in the amount of 10 to 30 $g/ft^3$ and is preferably present in the bottom layer in the amount of 0 to 10 $g/ft^3$; the platinum catalytic component is preferably present in the top layer in the amount of 0 to 30 $g/ft^3$ and is preferably present in the bottom layer in the amount of 10 to 40 $g/ft^3$; the rhodium catalytic component is preferably present in the top layer in the amount of 0 to 10 $g/ft^3$ and is preferably present in the bottom layer in the amount of 5 to 10 $g/ft^3$. The $NO_x$ sorbent is preferably present in each of the top and bottom layers in the amount of 0.1 to 0.8 $g/in^3$ in the case of the $NO_x$ sorbent being one or more basic oxygenated compounds of one or more alkali metals and preferably in the amount of 0.2 to 0.8 $g/in^3$ in the case of the $NO_x$ sorbent being one or more basic oxygenated compounds of one or more alkaline earth metals.

As a third embodiment, the catalytic trap of the invention may be prepared in the form of layers, but without any zones within either the bottom or the top layer. In this third embodiment, the catalytic trap will nevertheless be "multi-zoned" because of post-impregnated layers superimposed on "zones," i.e., "sections," of the top layer. Thus, in this third embodiment, the multi-zoned catalytic trap will be present in the form of a discrete bottom layer coated on a refractive carrier member and a discrete top layer overlying the top layer. The bottom layer will comprise a refractory metal oxide support having dispersed thereon a platinum catalytic component and a rhodium catalytic component and optionally a palladium catalytic component, while the top layer will comprise a refractory metal oxide support having dispersed thereon a palladium catalytic component and optionally a platinum and/or rhodium catalytic component. The "zoning" occurs because the catalytic trap further comprises a discrete first zone overlying a corresponding first section of the top layer and a discrete second zone overlying a corresponding second section of the top layer. The discrete first zone comprises a layer of a palladium catalytic component and a $NO_x$ sorbent comprising one or more basic oxygenated compounds of one or more metals selected from the group consisting of alkaline earth metals and alkali metals superimposed on top of the first section of the top layer, while the second zone comprising a layer of a $NO_x$ sorbent comprising one or more basic oxygenated compounds of one or more metals selected from the group consisting of alkaline earth metals and alkali metals superimposed on top of the second section of the top layer. Preferably, the first zone is superimposed on a section of the top layer comprising an area of about 20% to about 80% of the total area of the top layer.

As in the case of the first and second embodiments, in the multi-zoned catalytic trap of the third embodiment, the bottom layer and/or the top layer may each further comprise one or more components independently selected from the group of one or more oxides of nickel, manganese, iron, lanthanum, barium and zirconium.

In the multi-zoned catalytic trap of the third embodiment, it is preferred that the palladium catalytic component be present in the top layer in the amount of 0 to about 50 g/ft$^3$ and in the bottom layer in the amount of 0 to about 15 g/ft$^3$; the platinum catalytic component is preferably present in the top layer in the amount of 0 to about 30 g/ft$^3$ and in the bottom layer in the amount of about 30 to about 90 g/ft$^3$; the rhodium catalytic component is preferably present in the top layer in the amount of 0 to about 20 g/ft$^3$ and in the bottom layer in the amount of about 5 to about 10 g/ft$^3$; and the NO$_x$ sorbent is preferably present in each of the top and bottom layers in the amount of about 0.25 to about 1.0 g/in$^3$ in the case of the NO$_x$ sorbent being one or more basic oxygenated compounds of one or more alkali metals and in the amount of about 0.2 to about 0.6 g/in$^3$ in the case of the NO$_x$ sorbent being one or more basic oxygenated compounds of one or more alkaline earth metals.

Also in the multi-zoned catalytic trap of the third embodiment, it is preferred that palladium catalytic component be present in the first zone in an amount of about 30 to about 150 g/ft$^3$ and the NO$_x$ sorbent optionally be present in the first zone in the amount of about 0.25 to about 1.0 g/in$^3$ in the case of the NO$_x$ sorbent being one or more basic oxygenated compounds of one or more alkali metals and optionally in the amount of about 0.2 to about 0.6 g/in$^3$ in the case of the NO$_x$ sorbent being one or more basic oxygenated compounds of one or more alkaline earth metals. Preferably, the NO$_x$ sorbent is present in the second zone in the amount of about 0.25 to about 1.0 g/in$^3$ in the case of the NO$_x$ sorbent being one or more basic oxygenated compounds of one or more alkali metals and in the amount of about 0.2 to about 0.6 g/in$^3$ in the case of the NO$_x$ sorbent being one or more basic oxygenated compounds of one or more alkaline earth metals.

As in the case of the multi-zoned catalytic trap of the first two embodiments, it is preferred that the NO$_x$ sorbent in the bottom and top layers and in the first and second zones be independently selected from the group consisting of one or more basic oxygenated compounds of lithium, sodium, potassium, cesium, magnesium, calcium, strontium and barium. It is also preferred that the refractive carrier member, the bottom and top layers and the first and second zones be substantially free of silica components. Preferably, the carrier member will comprise a refractory material selected from the group consisting of a refractory metal and one or more of alumina, titania, zirconia, corundum, aluminum phosphate, zirconium phosphate, zirconium aluminum phosphate, a metal including zirconium phosphate and a metal including zirconium aluminum phosphate. Preferably, the refractory metal is selected from the group consisting of stainless steel, iron/chromium alloy, and titanium.

It is also preferred that the multi-zoned catalytic trap of the third embodiment of the invention be utilized in combination with a treatment catalyst disposed upstream of the catalytic trap relative to the exhaust gas stream, the treatment catalyst being effective at least to promote under oxidation conditions the oxidation of hydrocarbons to $CO_2$ and $H_2O$.

Another aspect of this invention relates to a method of treating an engine exhaust gas stream containing NO$_x$ to abate the NO$_x$ content of the stream which comprises maintaining the engine under alternating periods of lean and stoichiometric or rich operation, and contacting the stream during the periods of both lean and stoichiometric or rich operation with the multi-zoned catalytic trap of the first, second or third embodiment, under conditions whereby at least some of the NO$_x$ in the exhaust gas stream is adsorbed by the catalytic trap material during the periods of lean operation and is released from the catalytic trap material and reduced to nitrogen during the periods of stoichiometric or rich operation. Since the engine exhaust gas stream will contain hydrocarbons, it is preferred that the engine exhaust gas stream be contacted under oxidizing conditions with a catalyst effective to promote oxidation of the hydrocarbons in the engine exhaust gas stream, whereby the hydrocarbons are oxidized, prior to contact of the exhaust gas stream with the multi-zoned catalytic trap.

Typically, the temperature of the exhaust gas stream immediately prior to contact with the multi-zoned catalytic trap will be in the range of about 250 to about 850° C. The exhaust gas stream may enter the zone catalytic trap through the first zone and exit the trap through the second zone. Alternatively, the exhaust gas stream may enter the multi-zoned catalytic trap through the second zone and exit the trap through the first zone.

The multi-zoned catalytic trap of the first embodiment of the invention may be prepared by the steps of:
(A) preparing the first catalytic trap material by dispersing onto a refractory metal oxide support a palladium catalytic component in the amount of about 30 to about 300 g/ft$^3$, a platinum catalytic component in the amount of 0 to about 100 g/ft$^3$ and a rhodium catalytic component in the amount of 0 to about 10 g/ft$^3$ and a NO$_x$ sorbent comprising one or more basic oxygenated compounds of one or more alkaline earth metals and optionally one or more basic oxygenated compounds of one or more alkali metals by impregnating the support with a solution of a precursor palladium compound, a precursor platinum compound, a precursor rhodium compound and a precursor NO$_x$ sorbent compound in a liquid vehicle;
(B) coating the impregnated support resulting from step (A) onto a refractory carrier member;
(C) drying and thereafter heating the coated refractory carrier member resulting from step (B);
(D) preparing the second catalytic trap material by dispersing onto a refractory metal oxide support a palladium catalytic component in the amount of 0 to about 50 g/ft$^3$, a platinum catalytic component in the amount of about 10 to about 100 g/ft$^3$ and a rhodium catalytic component in the amount of about 5 to about 20 g/ft$^3$ and a NO$_x$ sorbent comprising one or more basic oxygenated compounds of one or more metals selected from the group consisting of alkaline earth metals and alkali metals by impregnating the support with a solution of a precursor palladium compound, a precursor platinum compound, a precursor rhodium compound and a precursor NO$_x$ sorbent compound in a liquid vehicle;
(E) coating the impregnated support resulting from step (D) onto a refractory carrier member;
(F) drying and thereafter heating the coated refractory carrier member resulting from step (E);
(G) preparing the optional intermediate catalytic trap materials by dispersing onto a refractory metal oxide support a palladium catalytic component in the amount of 25 to about 75 g/ft$^3$, a platinum catalytic component in the amount of about 5 to about 30 g/ft$^3$ and a rhodium catalytic component in the amount of 0 to about 10 g/ft$^3$ and a NO$_x$ sorbent comprising one or more basic oxygenated compounds of one or more metals selected from the group consisting of alkaline earth metals and alkali metals by impregnating the support with a solution of a precursor palladium compound, a precursor platinum compound, a precursor rhodium compound and a precursor $NO_x$ sorbent compound in a liquid vehicle;

(H) coating the optional impregnated support resulting from step (G) onto one or more refractory carrier members; and (I) drying and thereafter heating the one or more coated refractory carrier members resulting from step (I).

The multi-zoned catalytic trap of the second embodiment of the invention may be prepared in the form of layers by the steps of:

(1) coating the first, second and optional intermediate catalytic trap materials onto a refractory carrier member;

(2) drying and heating the resultant coated carrier member to provide a bottom layer of the first, second and optional intermediate catalytic washcoats; and (3) providing a top layer overlying the bottom layer, the top layer being prepared by coating the first, second and optional intermediate catalytic trap materials onto the refractory carrier member resulting from step (2) and thereafter drying and heating the resultant coated carrier member to provide a top layer of the first, second and optional intermediate catalytic washcoats.

The multi-zoned catalytic trap of the third embodiment of the invention may be prepared by the steps of:

(1) dispersing onto a refractory metal oxide support a platinum catalytic component and a rhodium catalytic component and optionally a palladium catalytic component and a $NO_x$ sorbent comprising one or more basic oxygenated compounds of one or more metals selected from the group consisting of alkaline earth metals and one or more alkali metals by impregnating the support with a solution of a precursor platinum compound, a precursor rhodium compound and optionally a precursor palladium compound and a precursor $NO_x$ sorbent compound in a liquid vehicle;

(2) coating the impregnated support resulting from step (1) onto a refractory carrier member;

(3) drying and thereafter heating the refractory carrier member resulting from step (2) to provide a refractory carrier member containing a bottom layer of a coating of the platinum catalytic component, the rhodium catalytic component, the optional palladium catalytic component and the $NO_x$ sorbent;

(4) dispersing onto a refractory metal oxide support a palladium catalytic component and optionally a platinum and/or rhodium catalytic component, and a $NO_x$ sorbent comprising one or more basic oxygenated compounds of one or more metals selected from the group consisting of alkaline earth metals and one or more alkali metals by impregnating the support with a solution of a precursor palladium compound and optionally a precursor platinum and/or precursor rhodium compound and a precursor $NO_x$ sorbent compound in a liquid vehicle;

(5) coating the impregnated support resulting from step (4) onto the bottom layer of the coated refractory member resulting from step (3);

(6) drying and thereafter heating the refractory carrier member resulting from step (5) to provide a refractory carrier member containing a top layer of the palladium catalytic component, the optional platinum and/or rhodium catalytic component and the $NO_x$ sorbent overlying said bottom layer;

(7) post-impregnating a discrete first zone of the layered refractory carrier member resulting from step (6) with a solution of a precursor of a precursor palladium compound and optionally a precursor of a $NO_x$ sorbent comprising one or more basic oxygenated compounds of one or more metals selected from the group consisting of alkaline earth metals and optionally one or more alkali metals in a liquid vehicle;

(8) post-impregnating a discrete second zone of the layered refractory carrier member resulting from step (7) with a solution of a precursor of a $NO_x$ sorbent comprising one or more basic oxygenated compounds of one or more metals selected from the group consisting of alkaline earth metals and alkali metals in a liquid vehicle; and (9) drying and heating the post-impregnated layered refractive carrier member resulting from step (8).

Figure 5A:
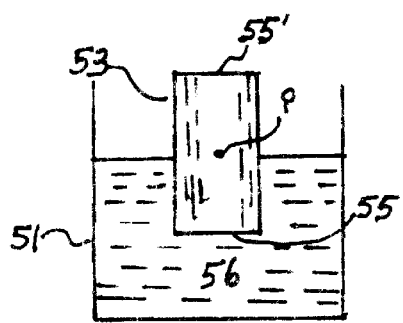
FIGS. 5A and 5B are schematic representations of two steps in the manufacture of the multi-zoned catalytic trap in accordance with the third embodiment of the present invention.
Figure 5B:
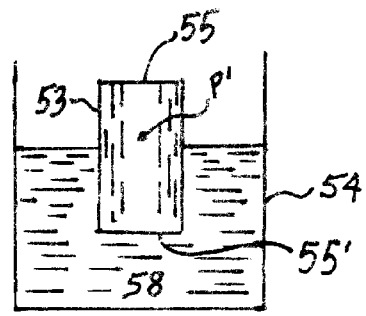

Steps (7) and (8) of the process pertaining to the steps of post-dipping for preparing the multi-zoned catalytic trap of the third embodiment of the invention above are shown in FIGS. 5A and 5B FIG. 5A shows a tank 51 within which is disposed a solution 56 of a catalytic palladium precursor compound and one or more $NO_x$ sorbent precursor compounds and FIG. 5B shows a tank 54 within which is dispersed a solution 58 of one or more $NO_x$ sorbent precursor compounds.

In FIG. 5A, a carrier member 53, which already has been prepared by steps (1)–(6) described above, is dipped, front face 55 first and rear face 55' uppermost, within solution 56 contained in tank 51 with the longitudinal axis of carrier ember 53 maintained substantially vertically. Carrier member 53 is dipped within solution 56 only to a depth defined by the point P along its longitudinal axis. After dipping, carrier member 53 is removed from solution 56 and dried. The dipping and drying may be repeated as many times as needed until the desired loading of the catalytic palladium precursor compound and the alkaline earth metal component precursor compound is attained.

In one embodiment, care is taken not to contact the solution 56 with the longitudinal segment of the carrier member 53 between point P and rear face 55'. In another embodiment, the entirety of carrier member 53 may be dipped within solution 56 so as to apply the catalytic palladium precursor compound and precursor $NO_x$ sorbent compounds along the entire length of the gas-flow passages (described with reference to FIGS. 1A and 1B below) of carrier member 53. After completion of the dipping step or steps illustrated in FIG. 5A, carrier member 53 is dipped within solution 58 in tank 54 (FIG. 5B) with front face 55 uppermost and rear face 55' submerged below the surface of solution 58. Carrier member 53 is dipped within solution 58 only to a depth indicated by the point P' along the longitudinal axis of carrier member 53. Point P' may be at the identical point along the longitudinal axis of carrier member 53 as point P, or point P' may be located between point P and rear face 55' so as to provide an intermediate section of carrier member 53 wherein the catalytic palladium and $NO_x$ sorbent precursor of both solutions 56 and 58 are present. Dipping of carrier member 53 into solution 58 may be repeated as described above with respect to the dippings of carrier member 53 into solution 56. Dippings are followed by drying and calcining.

FIG. 1 does not illustrate a multi-zoned catalytic trap within the scope of this invention, but rather depicts a single zoned catalytic trap which is shown for the purposes of clarity. FIG. 1 shows generally at 10 a catalytic trap comprising refractory carrier member 12 of generally cylindrical shape having a cylindrical outer surface, one end face comprising a face 14 and an opposite end face 14', which is identical to face 14. (In FIG. 1 there is visible only the junction of outer surface of the carrier member 12 with face 14' at its peripheral edge portion. Further, there is omitted from FIG. 1 the usual canister within which catalytic trap 10 would be enclosed, the canister having a gas stream inlet at face 14 and a gas stream outlet at face 14'; alternatively the gas stream inlet could be located at face 14' and the gas outlet stream located at face 14). Carrier member 10 has a plurality of fine, parallel gas-flow passages 16 formed therein, better seen in enlarged FIG. 1A. Gas-flow passages 16 are formed by walls 18a, 18b and extend through carrier 10 from face 14 to face 14' thereof, the passages 16 being unobstructed so as to permit the flow of, e.g., an exhaust stream, longitudinally through carrier 10 via gas-flow passages 16 thereof. As will be seen from FIGS. 1A and 1B, walls 18a, 18b are so dimensioned and configured that gas-flow passages 16 have a substantially regular polygonal shape, substantially square in the illustrated embodiment, but with rounded corners in accordance with U.S. Pat. No. 4,335,023, issued Jun. 15, 1982 to J. C. Dettling et al. Of course, gas-flow passages of any suitable cross-sectional shape, square, circular, hexagonal, etc., may be used. A layer 20, which in the art and sometimes below is referred to as a "washcoat," is adhered to the walls 18a, 18b and, as shown in FIG. 1B, may be comprised of a single layer comprising the $NO_x$ sorbent. Alternatively, as illustrated in FIG. 1B, layer or washcoat 20 may comprise a first discrete layer or bottom layer 20a and a second discrete layer or top layer 20b superposed over bottom layer 20a. In such alternative, the zone would correspond to one of the zones of the multi-zoned catalytic trap of the second embodiment of the invention. For purposes of illustration, the thickness of layers 20, 20a and 20b are exaggerated in FIGS. 1A and 1B.

Figure 1A:
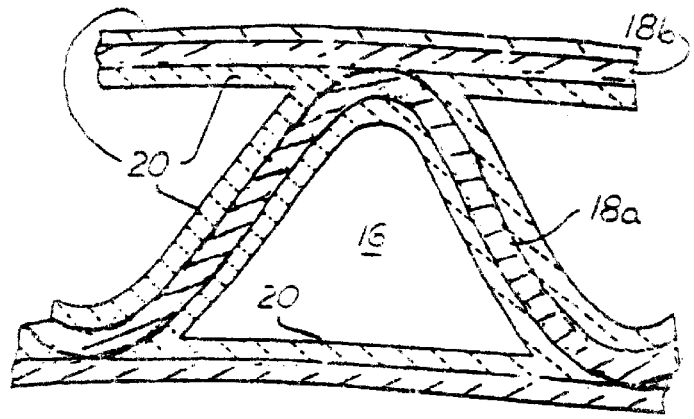
FIG. 1A is a partial cross-sectional view enlarged relative to FIG. 1 and taken along a plane parallel to the end faces of the carrier of FIG. 1.
Figure 1B:
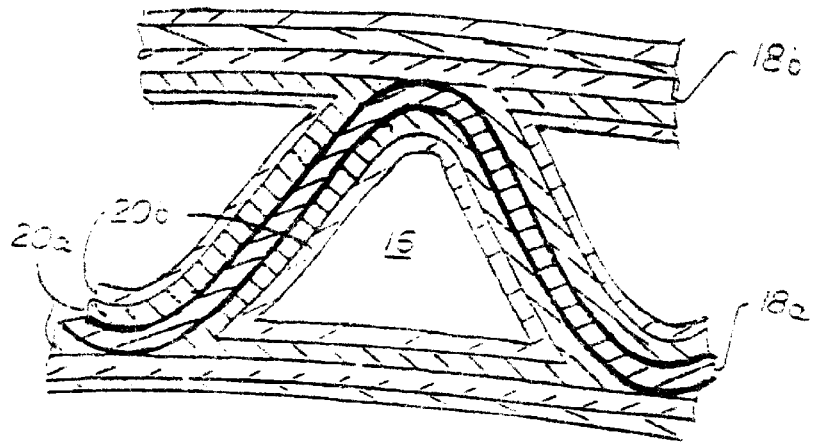
FIG. 1B is a view, enlarged relative to FIG. 1A, of one of the gas-flow passages shown in FIG. 1A.

As shown in FIGS. 1A–1B, the honeycomb-type carrier members include void spaces provided by the gas-flow passages, and the cross-sectional area of these passages and the thickness of the walls defining the passages will vary from one type of carrier member to another. Similarly, the weight of washcoat applied to such carriers will vary from case to case. Consequently, in describing the quantity of washcoat or catalytic component or other component of the composition, it is convenient, as noted above, to use units of weight of component per unit volume of catalyst carrier. Therefore, the units grams per cubic inch ("$g/in^3$") and grams per cubic foot ("$g/ft^3$") are used herein to mean the weight of a component per volume of the carrier member, including the volume of void spaces of the carrier member.

A typical method of manufacturing a catalytic trap in accordance with the present invention is to provide the catalytic $NO_x$ sorbent as a coating or layer of washcoat on the walls of the gas-flow passages of a suitable refractory carrier member such as a cordierite honeycomb carrier. This may be accomplished, as is well known in the art, by impregnating a fine particulate refractory metal oxide such as one of those discussed above, e.g., activated alumina (high surface area, predominately gamma alumina), with one or more catalytic metal components essentially including palladium and optionally including platinum and/or rhodium, drying and calcining the impregnated activated alumina particles and forming an aqueous slurry of these particles. Particles of a bulk $NO_x$ sorbent may be included in the slurry. Alternatively, the $NO_x$ sorbent may be dispersed into the support, preferably in a post-dipping operation, as described above. The activated alumina may have initially been thermally stabilized, as is well known in the art, by impregnating it with, for example, a solution of a soluble salt of barium, lanthanum, rare earth metal or other known stabilizer precursor, and calcining the impregnated activated alumina to form a stabilizing metal oxide dispersed onto the alumina. Base metal catalysts may optionally also have been impregnated into the activated alumina, for example, by impregnating a solution of nickel nitrate into the alumina particles and calcining to provide nickel oxide dispersed in the alumina particles.

Alternatively, the alumina or other support particles impregnated with the catalytic component may be mixed with bulk or supported particles of the $NO_x$ sorbent in an aqueous slurry, and this mixed slurry of catalytic component particles and $NO_x$ sorbent particles may be applied as a coating to the walls of the gas-flow passages of the carrier member. Preferably, however, for improved dispersion of the $NO_x$ sorbent, the washcoat of catalytic component material, after being dried and calcined, is immersed (post-dipped) into a solution of one or more precursor compounds (or complexes) of $NO_x$ sorbent to impregnate the washcoat with the $NO_x$ sorbent precursor. The impregnated washcoat is then dried and calcined to provide the $NO_x$ sorbent dispersed throughout the washcoat.

Separate, discrete layers of washcoat may be applied in successive impregnating/drying/calcining operations, e.g., to provide a bottom washcoat layer containing, e.g., substantially all of the optional platinum catalytic component and a top washcoat layer containing, e.g., substantially all of the palladium catalytic component. Alternatively, substantially all the palladium catalytic component may be contained in the bottom washcoat layer and substantially all the platinum catalytic component may be contained in the top layer. In a third variation, platinum and palladium catalytic components, or portions thereof, may be contained in both the top and bottom layers of washcoat. A rhodium catalytic component may supplement or replace the platinum catalytic component in any of the above combinations. Further, more than two washcoat layers may be provided. The $NO_x$ sorbent may be dispersed by impregnation into, e.g., both the top and bottom layers.

Figure 2:
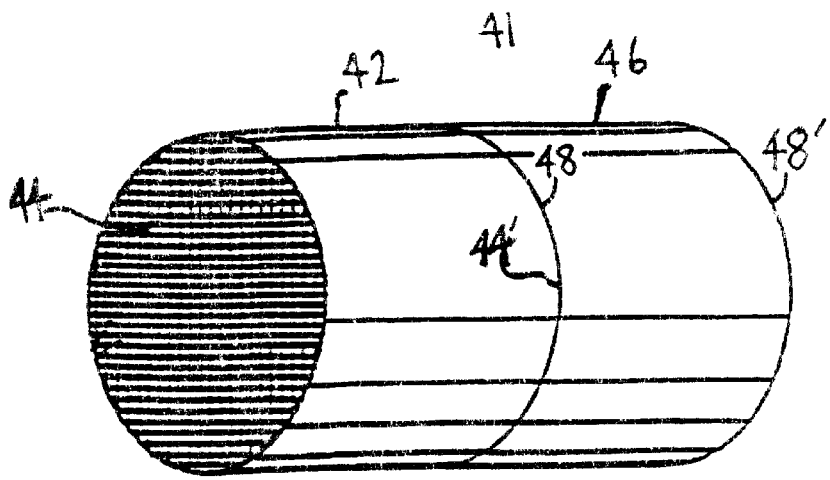
FIG. 2 is a perspective view of a multi-zoned catalytic trap having a first zone and a second zone in accordance with the first embodiment of the invention.

FIG. 2 illustrates a multi-zoned catalytic trap 41 of the first embodiment of the invention comprised of first zone catalytic trap 42 having front and rear faces 44 and 44', respectively, and second zone catalytic trap 46 with front and rear faces 48 and 48', respectively. First zone catalytic trap 42 is arranged in longitudinal alignment with second zone catalytic trap 46 such that rear face 44' of first zone catalytic trap 42 is juxtaposed to, i.e., is in abutting contact with, front face 48 of second zone catalytic trap 46. (In FIG. 2, only a portion of the peripheral edges of rear face 44' of first zone catalytic trap 42 and front face 48 of second zone catalytic trap 46 are visible. Further, a suitable canister having an inlet and an outlet and within which first and second zone catalytic traps 42 and 46 would be enclosed is omitted from FIG. 2.) In this arrangement, the exhaust being treated flows into multi-zoned catalytic trap 41 via front face 44 of first zone catalytic trap 42, through the gas-flow passages (not visible in FIG. 2, but shown in FIGS. 1A and 1B) out rear face 44' thereof and into front face 48 of second zone catalytic trap 46. The exhaust being treated flows through the gas-flow passages (not visible in FIG. 2, but shown in FIGS. 1A and 1B) of second zone catalytic trap 46 and exits from rear face 48' thereof. Alternatively, the exhaust being treated may flow into multi-zoned catalytic trap 41 via rear face 48' of second zone catalytic trap 46, through the gas-flow passages (not visible in FIG. 2, but shown in FIGS. 1A and 1B) out front face 48 thereof and into rear face 44' of first zone catalytic trap 42. The exhaust being treated flows through the gas-flow passages (not visible in FIG. 2, but shown in FIGS. 1A and 1B) of first zone catalytic trap 42 and exits from front face 44 thereof.

Figure 3:
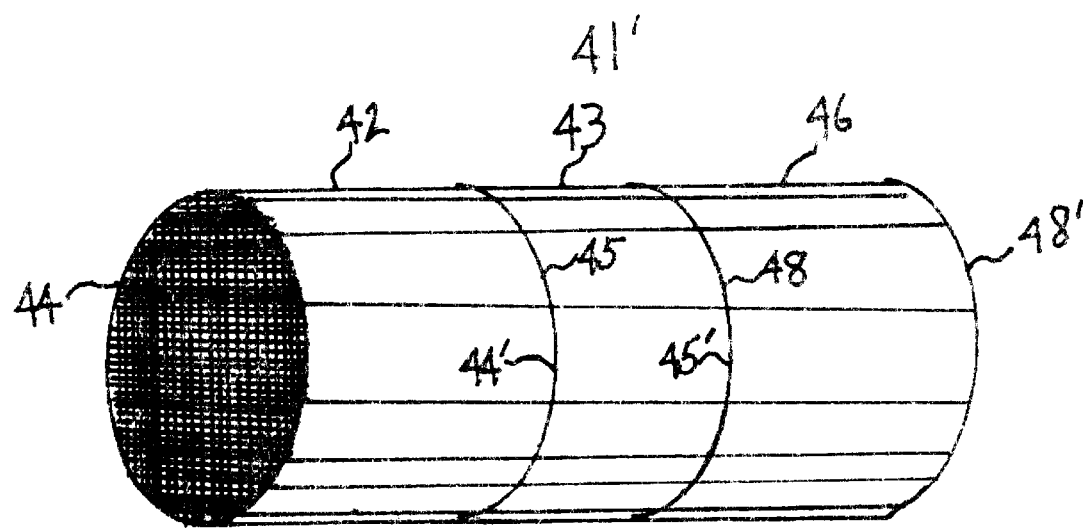
FIG. 3 is a perspective view of a multi-zoned catalytic trap having a first zone, a second zone and an optional intermediate zone disposed between the first zone and the second zone in accordance with the first embodiment of the invention.

FIG. 3 illustrates a multi-zoned catalytic trap 41' of the first embodiment of the invention comprised of first zone catalytic trap 42 having front and rear faces 44 and 44', respectively, and second zone catalytic trap 46 with front and rear faces 48 and 48', respectively, and optional intermediate zone catalytic trap 43 having front and rear faces 45 and 45', respectively. Optional intermediate zone catalytic trap 43 is arranged in longitudinal alignment with the first zone catalytic trap 42 and the second zone catalytic 46 such that its front face 45 is juxtaposed to, i.e., is in abutting contact with, rear face 44' of the first zone catalytic trap 42 and its rear face 45' is juxtaposed to, i.e., is in abutting contact with, front face 48 of the second zone catalytic trap 46. The multizoned catalytic trap illustrated in FIG. 3 functions in all respects in the same manner as the multi-zone catalytic trap illustrated in FIG. 2.

In use, the exhaust gas stream which is contacted with the multi-zoned catalytic trap of the present invention is alternately adjusted between lean and stoichiometric/rich operating conditions so as to provide alternating lean operating periods and stoichiometric/rich operating periods. It will be understood that the gas stream, e.g., exhaust, being treated may be selectively rendered lean or stoichiometric/rich either by adjusting the air-to-fuel ratio fed to the engine generating the exhaust or by periodically injecting a reductant into the gas stream upstream of the catalyst. For example, the composition of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions.

Figure 4:
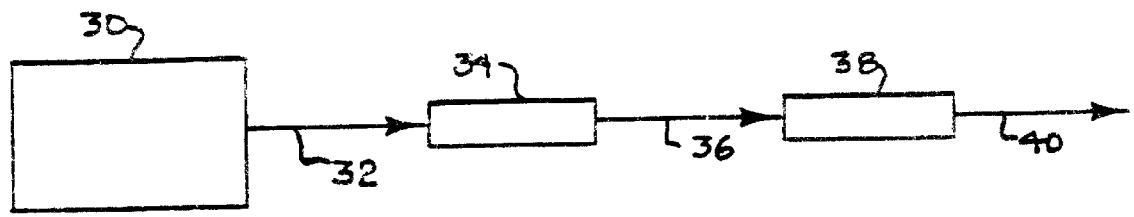
FIG. 4 is a schematic representation of a treatment system for an engine exhaust comprising an optional pretreatment catalyst disposed upstream of the multi-zoned catalytic trap in accordance with the present invention.

FIG. 4 schematically illustrates the utilization of a treatment system in which a pretreatment catalyst is interposed in the exhaust stream upstream of the multi-zoned catalytic trap of the present invention. Thus, a lean-burn or partial lean-burn engine 30 discharges its exhaust from an exhaust gas manifold (not shown) to an exhaust line 32, which introduces the exhaust into a pretreatment catalyst 34, which comprises a catalyst which is suitable to promote at least the oxidation of hydrocarbons. Catalyst 34 may comprise a conventional TWC catalyst which would typically include platinum, palladium and rhodium catalytic components dispersed on a high surface area refractory support and may optionally also contain one or more sulfur trap components such as oxides of nickel, manganese and iron. Such catalysts can be stabilized against thermal degradation by well-known expedients such as impregnating an activated alumina support with one or more rare earth metal oxides, e.g., ceria. Such stabilized catalysts can sustain very high operating temperatures. For example, if a fuel cut technique is utilized, temperatures as high as 950° C. may be sustained in pretreatment catalyst 34. In any case, a significant portion of the hydrocarbons contained in the exhaust stream is oxidized to $CO_2$ and $H_2O$ in pretreatment catalyst 34. The effluent from pretreatment catalyst 34 passes via line 36 to multi-zoned catalytic trap 38 in accordance with an embodiment of the present invention, wherein $NO_x$ is stored and then reduced during respective lean and stoichiometric operating cycles as described above. The treated exhaust stream is discharged to the atmosphere via tailpipe 40.

In the following examples, all percentages of a given component of a combination are percent by weight, calcined basis, of the total weight of the combination, including that of the given component. Reference to, e.g., "73% of 0.56% $Pt/Al_2O_3$," means that alumina particles containing 0.56% by weight Pt (weight of Pt divided by the weight of Pt plus $Al_2O_3$, calcined basis, result multiplied by 100,=0.56%) comprises 73% by weight of the slurry solids (calcined basis) of which the $Pt/Al_2O_3$ is a part.

In the examples, all of the single-zoned and the multi-zoned catalytic traps were prepared with a two-layered washcoat, a bottom coat and a top coat. The preparation of the bottom and top coats are set forth below.

EXAMPLE 1

Sample Catalytic Traps

This example provides five catalytic traps prepared by exactly the same procedures and containing the ingredients indicated in respect to each trap. Each trap had a width of 4.66 inches and a length of six inches and was placed within a container (i.e., "canned" in a typical catalytic trap container).

Catalytic Trap A Bottom Layer:

Platinum: 60 $g/ft^3$

Rhodium: 0 $g/ft^3$

Palladium: 0 $g/ft^3$ $NO_x$ sorbent: 0.115 $g/in^3$ BaO; 0.50 $g/in^3$ $CeO_2$—$ZrO_2$; 0.08 $g/in^3$ $ZrO_2$ Catalytic Trap A Top Layer:

Platinum: 30 $g/ft^3$

Rhodium: 30 $g/ft^3$

Palladium: 200 $g/ft^3$ $NO_x$ sorbent: 0.20 $g/in^3$ BaO; 0.25 $g/in^3$ $CeO_2$—$ZrO_2$; 0.08 $g/in^3$ $ZrO_2$ For Catalytic Trap A, the washcoat employed for the bottom layer had a loading of 2.0 $g/in^3$ and contained 60 $g/ft^3$ precious metals and 0.15 $g/in^3$ $NO_x$ sorbent. The washcoat employed for the top layer had a loading of 2.4 $g/in^3$ and contained 260 $g/ft^3$ precious metals and 0.2 $g/in^3$ $NO_x$ sorbent. After the one-zoned catalytic trap was prepared, it was post-dipped with Cs to provide a $Cs_2O$ post-dipped coat of 0.35 $g/in^3$. The catalytic trap was calcined at 550° C. for 1 hour after each layer was applied. The total precious metal content for both layers of this trap was 320 $g/ft^3$.

Catalytic Trap B Bottom Layer:

Platinum: 60 $g/ft^3$

Rhodium: 15 $g/ft^3$

Palladium: 0 $g/ft^3$ $NO_x$ sorbent: 0.35 $g/in^3$ BaO; 0.50 $g/in^3$ $CeO_2$—$ZrO_2$; 0.08 $g/in^3$ $ZrO_2$ Catalytic Trap B Top Layer:

Platinum: 0 $g/ft^3$

Rhodium: 0 $g/ft^3$

Palladium: 90 $g/ft^3$ $NO_x$ sorbent: 0.20 $g/in^3$ BaO; 0.25 $g/in^3$ $CeO_2$—$ZrO_2$; 0.08 $g/in^3$ $ZrO_2$ For Catalytic Trap B, the washcoat employed for the bottom layer had a loading of 2.2 $g/in^3$ and contained 75 $g/ft^3$ precious metals and 0.35 $g/in^3$ $NO_x$ sorbent. The washcoat employed for the top layer had a loading of 2.1 $g/in^3$ and contained 90 $g/ft^3$ precious metals and 0.2 $g/in^3$ $NO_x$ sorbent. After the one-zoned catalytic trap was prepared, it was post-dipped with Cs to provide a $Cs_2O$ post-dipped coat of 0.35 $g/in^3$. The catalytic trap was calcined at 550° C. for 1 hour after each layer was applied. The total precious metal content for both layers of this trap was 165 g/ft$^3$.

Catalytic Trap C is identical to Catalytic Trap B, except that the BaO content of the bottom layer was 0.15 g/in$^3$, the CeO$_2$—ZrO$_2$ content was 0.10 g/in$^3$ and it was post-dipped with Ba rather than Cs.

Catalytic Trap D Bottom Layer:
Platinum: 30 g/ft$^3$
Rhodium: 5 g/ft$^3$
Palladium: 0 g/ft$^3$
NO$_x$ sorbent: 0g/in$^3$BaO; 0.50 g/in$^3$ CeO$_2$—ZrO$_2$; 0.08 g/in$^3$ ZrO$_2$ Catalytic Trap D Top Layer:
Platinum: 0 g/ft$^3$
Rhodium: 0 g/ft$^3$
Palladium: 90 g/ft$^3$
NO$_x$ sorbent: 0 g/in$^3$BaO; 0.25 g/in$^3$ CeO$_2$—ZrO$_2$; 0.08 g/in$^3$ ZrO$_2$ For Catalytic Trap D, the washcoat employed for the bottom layer had a loading of 2.1 g/in$^3$ and contained 35 g/ft$^3$ precious metals and 0 g/in$^3$NO$_x$ sorbent. The washcoat employed for the top layer had a loading of 1.9 g/in$^3$ and contained 90 g/ft$^3$ precious metals and 0 g/in$^3$ NO$_x$ sorbent. After the one-zoned catalytic trap was prepared, it was post-dipped with Cs and Ba to provide a Cs$_2$O post-dipped coat of 0.35 g/in$^3$ and a BaO post-dipped coat of 0.25 g/in$^3$. The catalytic trap was calcined at 550° C. for 1 hour after each layer was applied. The total precious metal content for both layers was 125 g/ft$^3$.

Catalytic Trap E Bottom Layer:
Platinum: 30 g/ft$^3$
Rhodium: 5 g/ft$^3$
Palladium: 0 g/ft$^3$
NO$_x$ sorbent: 0.15 g/in$^3$BaO; 0.0 g/in$^3$ CeO$_2$—ZrO$_2$; 0.08 g/in$^3$ ZrO$_2$ Catalytic Trap E Top Layer:
Platinum: 0 g/ft$^3$
Rhodium: 0 g/ft$^3$
Palladium: 50 g/ft$^3$
NO$_x$ sorbent: 0.25 g/in$^3$BaO; 0.0 g/in$^3$ CeO$_2$—ZrO$_2$; 0.08 g/in$^3$ ZrO$_2$ For Catalytic Trap E, the washcoat employed for the bottom layer had a loading of 2.25 g/in$^3$ and contained 35 g/ft$^3$ precious metals and 0.15 g/in$^3$NO$_x$ sorbent. The washcoat employed for the top layer had a loading of 2.1 g/in$^3$ and contained 50 g/ft$^3$ precious metals and 0.25 g/in$^3$ NO$_x$ sorbent. After the one-zoned catalytic trap was prepared, it was post-dipped with Cs and Ba to provide a Cs$_2$O post-dipped coat of 0.45 g/in$^3$ and a BaO post-dipped coat of 0.35 g/in$^3$ The catalytic trap was calcined at 550° C. for 1 hour after each layer was applied. The total precious metal content for both layers of this trap was 115 g/ft$^3$.

Catalytic Trap F is a multi-zoned trap in accordance with the second embodiment of the invention (Catalytic Traps A–E are single-zoned catalytic traps). Catalytic Trap F was prepared by juxtaposing 2 inches of Catalytic Trap C and 4 inches of Catalytic Trap E such that the traps were abutting each other (as illustrated in FIG. 2) and placing the combination in the same type of container as that employed for Catalytic Traps A–E. For Catalytic Trap F, the precious metal distribution was as follows: Pt=40 g/ft$^3$, Rh=8.3 g/ft$^3$ and Pd=60.3 g/ft$^3$. The total precious metal content was 108.6 g/ft$^3$.

EXAMPLE 2

Procedure for Preparation of Catalytic Traps

Bottom Coat

1. Deposition (Pt and Rh on Al$_2$O$_3$)

Alumina powder having a surface area of about 150 square meters per gram ("m$^2$/g") was impregnated with a solution of platinum amine hydroxide and rhodium nitrate to give in the bottom coat of the finished catalytic trap sample the specified platinum and rhodium loading The preparation was carried out by diluting the platinum and rhodium-containing solution with distilled water to provide sufficient solution to bring the batch of alumina powder to incipient wetness of the alumina. Using a planetary mixer, the alumina was impregnated by slowly dripping the diluted platinum and rhodium solution from a separatory funnel onto the alumina in a mixing bowl and mixing for approximately 10 to 15 minutes. The separatory funnel was rinsed with distilled water and a quantity of lanthanum nitrate equal to 5% of the weight of the alumina was dissolved in the distilled water. While still mixing the impregnated alumina with the planetary mixer, the lanthanum nitrate solution was dripped slowly from the separatory funnel onto the platinum and rhodium-impregnated alumina.

2. Slurry Preparation

The impregnated alumina obtained in step 1 above was shear-mixed with distilled water (some of which was reserved for use later in the preparation) and a few drops of octanol. The remaining lanthanum-nitrate solution was added to the alumina as well as a solution of barium acetate and zirconium acetate in amounts to attain in the finished catalytic trap the specified loading of metal oxides. The resulting slurry was continuously milled until a particle size of 90% of the particles having a diameter of 12 microns or less was attained. A ceria-zirconia powder may be added in an amount to give a specified loading of 0.5 g/in$^3$ in the finished sample trap member and the reserved distilled water was added. Acetic acid (about 75 to 100 ml) was added to reduce viscosity, providing a pH of about 5 to 5.25. The slurry was continuously milled to a particle size of 90% of the particles having a diameter of 9 microns or less.

3. Coating

The properties of the slurry obtained in step 2 above were adjusted for coating by adding distilled water to lower the concentration of solids and adding acetic acid. Cylindrical cordierite substrates measuring 4.66 inches in diameter and 6 inches in length were coated with the slurry to achieve (after drying and calcining) a target bottom coat loading of 2 g/in$^3$, including a specified loading of Pt and Rh on the Al$_2$O$_3$. The coated substrates were dried at 110° C. for 4 hours and calcined at 550° C. for 1 hour in air.

Top Coat

4. Deposition (Pd on Al$_2$O$_3$)

Alumina was impregnated with a palladium amine hydroxide solution to provide in the top coat of the catalytic trap the palladium loading indicated in the Examples. Distilled water was added to provide an amount of solution sufficient to attain incipient wetness of the alumina powder. Using a planetary mixer, the alumina was impregnated with the palladium solution by slowly dripping the diluted palladium solution from a separatory funnel onto the alumina in the mixing bowl and mixing for approximately 10 to 15 minutes. The separatory funnel was rinsed with a small amount of distilled water and acetic acid was added to the alumina in an amount of about 3% of the weight of the alumina. While still mixing the palladium-impregnated alumina with the planetary mixer, the diluted acetic acid solution was dripped slowly from the separatory funnel onto the alumina.

5. Slurry Preparation

The palladium-impregnated alumina obtained from step 4 was mixed with distilled water (reserving some for later in the preparation) and octanol. The palladium-impregnated alumina obtained from step 4 plus barium acetate and zirconium acetate were added to the slurry in amounts to provide in the top coat the specified loading of BaO and $ZrO_2$ The slurry was continuously milled to attain a particle size of 90% of the particles having a diameter of less than 12 microns. The slurry was continuously milled to lower the particle size to 90% of the particles having a diameter of less than 9 microns.

6. Coating

The bottom coat-containing substrates obtained from step 3 of this Example were coated with the slurry obtained from step 6 of this Example to achieve a target top coat loading of about 2 $g/in^3$, including a loading of the $Pd/Al_2O_3$ obtained from step 4 of this Example. The coated substrates were dried at 110° C. for 4 hours and then calcined at 550° C. for 1 hour in air.

7. Post-dipping

The calcined catalyst was then post-dipped in a solution of cesium nitrate and/or barium nitrate, $NO_x$ sorbent precursor compounds, in an amount to provide in the finished catalytic trap the weights of cesium oxide and/or barium oxide indicated in Example 1. The post-dipped trap members were then dried at 110° C. for 4 hours and calcined at 550° C. for 1 hour.

EXAMPLE 3

Testing of Fresh Catalytic Traps

Figure 6:
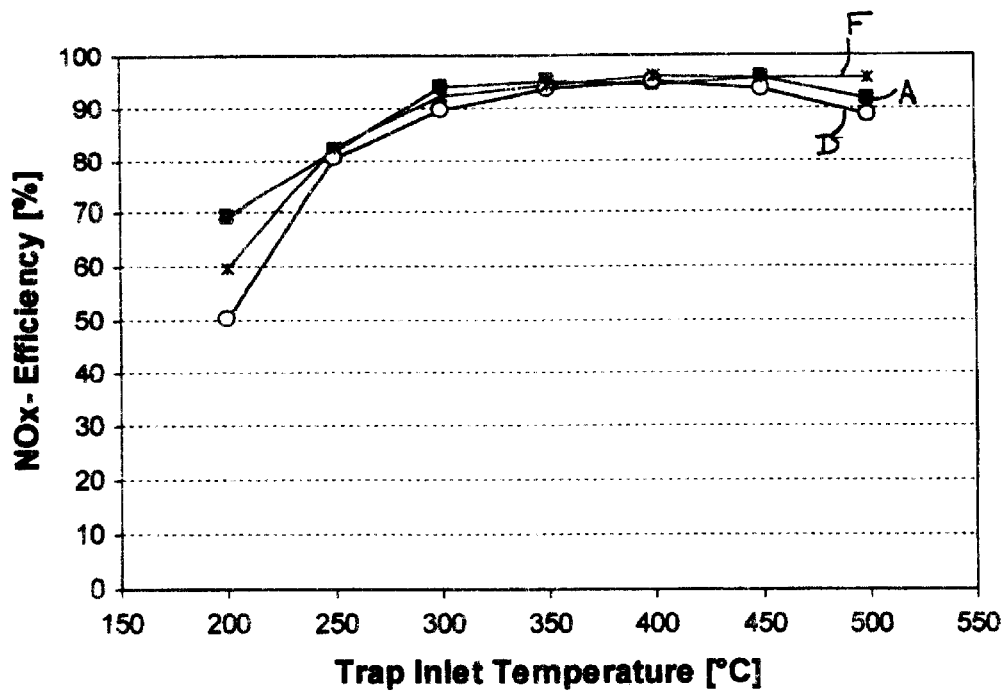
FIG. 6 is a graph of "$NO_x$ conversion curves" for a fresh temperature screening (i.e., no aging) of two single-zoned catalytic traps and the multi-zoned catalytic trap of the second embodiment of the invention obtained by plotting on the vertical axis the percent of $NO_x$ in the inlet stream to the catalytic traps which is converted to $N_2$, by being contacted with the traps, and on the horizontal axis the temperature in degrees centigrade of the inlet stream immediately prior to its entering the trap.

Catalytic traps A, D and F were evaluated without any pre-catalysts (i.e,. Catalytic traps only) in an engine under the following conditions:

Space Velocity: 40,000/h
Time, lean: 60 seconds
$\lambda$, lean: 1.30
$NO_x$ Concentration: 350 ppm
Time, rich: 2 seconds
$\lambda$, rich: 0.80
Fuel Sulfur: 50 ppm The results of this evaluation are illustrated in FIG. 6 in which the $NO_x$ conversion efficiency results are measured in percent on the vertical axis and the catalytic trap inlet temperatures, in 50° C. increments over the range of 200 to 500° C., are shown on the horizontal axis. As may be seen from FIG. 6, under fresh conditions, the catalytic traps all exhibited very similar $NO_x$ conversions over the indicated temperature window.

EXAMPLE 4

Testing of Aged Catalytic Traps

Figure 7:
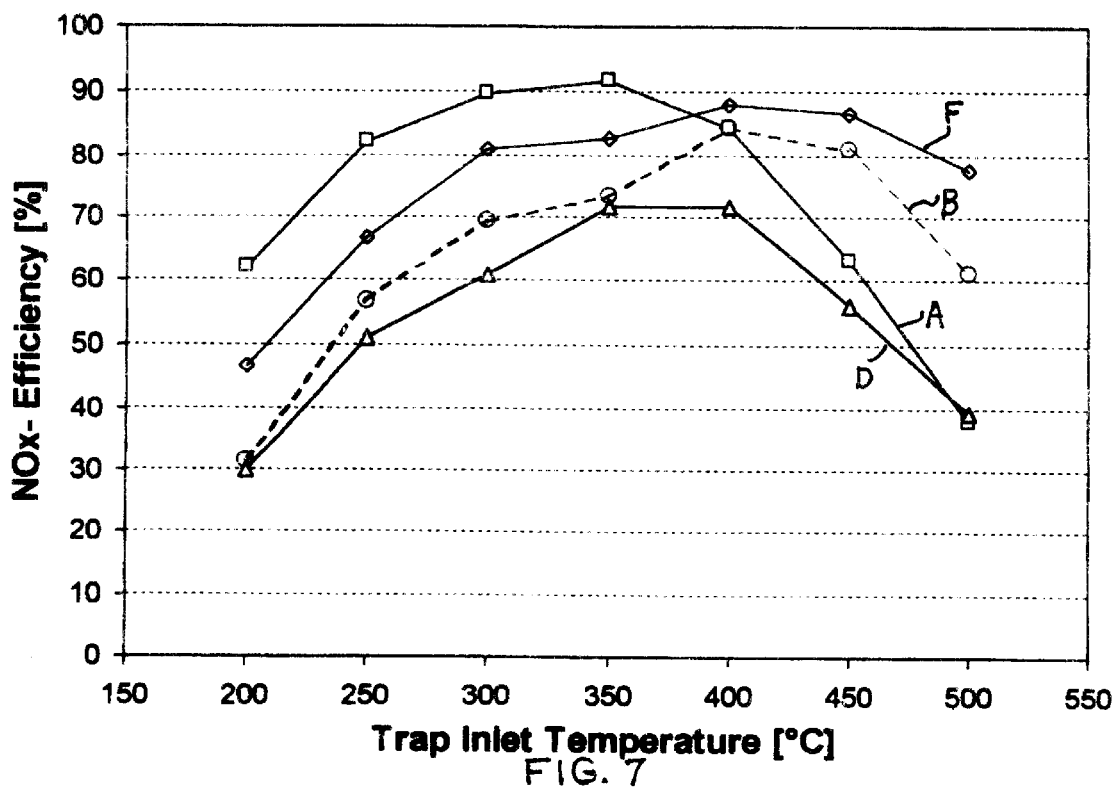
FIG. 7 is a graph of "$NO_x$ conversion curves" for temperature screening of three single-zoned catalytic traps and the multi-zoned catalytic trap of the second embodiment of the invention after aging obtained by plotting on the vertical axis the percent of $NO_x$ in the inlet stream to the test multi-zoned catalytic trap which is converted to $N_2$, by being contacted with the traps, and on the horizontal axis the temperature in degrees centigrade of the inlet stream immediately prior to its entering the trap.

Catalytic traps A, B, D and F were engine-aged in an exhaust after they were canned and installed in an exhaust treatment apparatus in the under-floor position of a vehicle, downstream from a close-couple three-way catalyst. The catalytic traps were aged at an inlet temperature of 800° C. for 25 hours at stoichiometric conditions subject to five seconds fuel cut every five minutes. This fuel cut created a change from stoichiometric to lean conditions, under which the catalytic traps were expected to lose durability. After aging, the catalytic traps were evaluated under steady state conditions at trap inlet temperatures ranging from 200 to 500° C. The test conditions may be summarized as follows:

Space Velocity: 40,000/h
Time, lean: 60 seconds
$\lambda$, lean: 1.30
$NO_x$ Concentration: 350 ppm
Time, rich: 2 seconds
$\lambda$, rich: 0.80
Fuel Sulfur: 50 ppm The catalytic trap inlet temperatures were varied in 50° C. increments by changing the speed and load on the engine while retaining a fixed space velocity of 40,000/h. The results of this evaluation are illustrated in FIG. 7. It is clear from FIG. 7 that catalytic trap F which is a multi-zoned catalytic trap in accordance with the second embodiment of the invention having a total precious metal content of 115 $g/ft^3$ exhibited significantly better $NO_x$ conversion than single-zoned catalytic traps A, B or D in spite of the fact that each of the three single-zoned catalytic traps had a higher total precious metal content.

Aged catalytic traps A, D and F were also compared in respect to their hydrocarbon and carbon monoxide conversion efficiencies measured at 350° C. under the following test conditions:

Space Velocity: 40,000/h
$\lambda$, lean: 1.30
HC Concentration: 100–150 ppm
CO Concentration: 1600–1800 ppm
Fuel Sulfur: 50 ppm The results of these evaluation were as follows: multi-zoned catalytic trap F of the invention exhibited hydrocarbon conversion of over 95% while single-zoned catalytic trap A exhibited hydrocarbon conversion of 90% and single-zoned catalytic trap D exhibited hydrocarbon conversion of 78%. The CO conversion for the three catalytic traps was identical: about 92%.

EXAMPLE 5

Catalytic Trap of the Third Embodiment

Single-zoned catalytic trap E was post-dipped in a palladium amine hydroxide solution as well as with the cesium nitrate and the barium nitrate $NO_x$ sorbents in accordance with the procedure set forth in step 7 of Example 2. The post-dipping was carried out in a manner such that one-third of the top coat layer of the catalytic trap contained an additional palladium loading of 60 $g/ft^3$ and the cesium and barium $NO_x$ sorbents while the remaining two-thirds of the top layer contained only the cesium and barium $NO_x$ sorbents (this technique is illustrated in FIGS. 5A and 5B). The resultant multi-zoned catalytic trap is hereinafter referred to as Catalytic Trap G. The total precious metal content of Catalytic Trap G was 105 $g/ft^3$.

Single-zone catalytic trap E and multi-zone catalytic trap G were then aged in a 10% steam/7.5% air mixture for 12 hours at 750° C. prior to testing. The catalytic traps were then canned and tested in a manner similar to that of Example 4 under the following test conditions:

Space Velocity: 40,000/h
Time, lean: 60 seconds
$\lambda$, lean: 1.50
$NO_x$ Concentration: 500 ppm Time, rich: 6 seconds λ, rich: 0.86

Fuel Sulfur: 0 ppm

Figure 8:
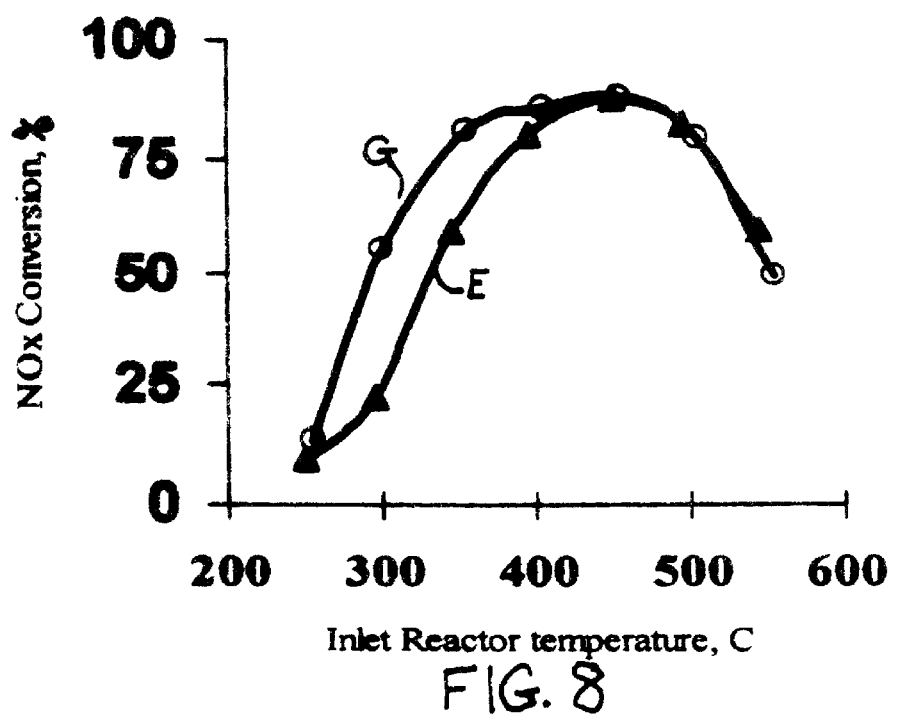
FIG. 8 is a graph of "$NO_x$ conversion curves" for temperature screening of a single-zoned catalytic trap and a multi-zoned catalytic trap of the third embodiment of the invention after aging obtained by plotting on the vertical axis the percent of $NO_x$ in the inlet stream to the test multi-zoned catalytic trap which is converted to $N_2$, by being contacted with the trap, and on the horizontal axis the temperature in degrees centigrade of the inlet stream immediately prior to its entering the trap.

Catalytic traps E and G were evaluated under steady state conditions at trap inlet temperatures ranging from 200 to 500° C. and the results are illustrated in FIG. 8. As may be seen from FIG. 8, the multi-zoned catalytic trap G of the third embodiment showed significantly higher $NO_x$ conversion at the lower portion of the temperature window, i.e., from about 250 to 350° C., and the identical $NO_x$ conversion at the higher end of the temperature window, i.e., from about 400 to 550° C.

What is claimed is:

1. A multi-zoned catalytic trap for conversion of $NO_x$ in an exhaust gas stream which emanates from an engine which is operated with periodic alternations between lean, and stoichiometric or rich, conditions, said catalytic trap comprising a first zone, a second zone and, optionally, one or more intermediate zones disposed between the first zone and the second zone, said first zone comprising a first catalytic trap material coated on a refractory carrier member, said first catalytic trap material comprising:

(A) a refractory metal oxide support having dispersed thereon a palladium catalytic component in the amount of about 30 to about 300 $g/ft^3$, a platinum catalytic component in the amount of 0 to about 100 $g/ft^3$ and a rhodium catalytic component in the amount of 0 to about 10 $g/ft^3$; and (B) a $NO_x$ sorbent comprising one or more basic oxygenated compounds of one or more alkaline earth metals and optionally, one or more basic oxygenated compounds of one or more alkali metals;

said second zone comprising a second catalytic trap material coated on a refractory carrier member, said second catalytic trap material comprising:

(1) a refractory metal oxide support having dispersed thereon a palladium catalytic component in the amount of 0 to about 50 $g/ft^3$, a platinum catalytic component in the amount of about 10 to about 100 $g/ft^3$ and a rhodium catalytic component in the amount of about 5 to about 20 $g/ft^3$; and (2) a $NO_x$ sorbent comprising one or more basic oxygenated compounds of one or more metals selected from the group consisting of alkaline earth metals and alkali metals;

said one or more optional intermediate zones comprising one or more optional intermediate catalytic trap materials coated on one or more refractory carrier members, said optional intermediate catalytic trap materials comprising:

(a) a refractory metal oxide support having dispersed thereon a palladium catalytic component in the amount of about 25 to about 75 $g/ft^3$, a platinum catalytic component in the amount of about 5 to about 30 $g/ft^3$ and a rhodium catalytic component in the amount of 0 to about 10 $g/ft^3$; and (b) a $NO_x$ sorbent comprising one or more basic oxygenated compounds of one or more metals selected from the group consisting of alkaline earth metals and alkali metals.

2. The catalytic trap of claim 1 wherein the $NO_x$ sorbent in the first, second and the optional intermediate zones is independently selected from the group consisting of one or more basic oxygenated compounds of lithium, sodium, potassium, cesium, magnesium, calcium, strontium and barium.

3. The catalytic trap of claim 2 wherein the $NO_x$ sorbent comprises a basic oxygenated compound of potassium.

4. The catalytic trap of claim 2 wherein the $NO_x$ sorbent comprises a basic oxygenated compound of cesium.

5. The catalytic trap of claim 2 wherein the $NO_x$ sorbent comprises a basic oxygenated compound of barium.

6. The catalytic trap of claim 2 wherein the $NO_x$ sorbent comprises a basic oxygenated compound of strontium.

7. The catalytic trap of claim 2 wherein the $NO_x$ sorbent comprises a basic oxygenated compound of sodium.

8. The catalytic trap of claim 2 wherein the $NO_x$ sorbent is present in the first, second and optional intermediate zones in the total amount of at least about 0.3 $g/in^3$.

9. The catalytic trap of claim 7 wherein the $NO_x$ sorbent is present in the first zone, second zone and optional intermediate zones in the total amount of about 0.3 to about 2.5 $g/in^3$.

10. The catalytic trap of claim 1 wherein the palladium catalytic component is present in the first catalytic trap material in the amount of 50 to 200 $g/ft^3$, the platinum catalytic component is present in the first catalytic trap material in the amount of 0 to 50 $g/ft^3$ and the rhodium catalytic component is present in the first catalytic trap material in the amount of 0 to 10 $g/ft^3$.

11. The catalytic trap of claim 1 wherein the palladium catalytic component is present in the second catalytic trap material in the amount of 0 to 50 $g/ft^3$, the platinum catalytic component is present in the first catalytic trap material in the amount of 30 to 100 $g/ft^3$ and the rhodium catalytic component in the first catalytic trap material is present in the amount of 5 to 20 $g/ft^3$.

12. The catalytic trap of claim 1 wherein the palladium catalytic component is present in the optional intermediate catalytic trap materials in the amount of 30 to 50 $g/ft^3$, the platinum catalytic component is present in the optional intermediate catalytic trap materials in the amount of 10 to 20 $g/ft^3$ and the rhodium catalytic component is present in the optional catalytic trap materials is in the amount of 0 to 10 $g/ft^3$.

13. The catalytic trap of claim 1 wherein the total amount of palladium catalytic components plus platinum catalytic components plus rhodium catalytic components present in the first zone, second zone and the optional intermediate zones is not greater than about 165 $g/ft^3$.

14. The catalytic trap of claim 13 wherein the total amount of palladium catalytic components plus platinum catalytic components plus rhodium catalytic components present in the first zone, second zone and the optional intermediate zones is not greater than 125 $g/ft^3$.

15. The catalytic trap of claim 1 wherein the refractive carrier member on which the first catalytic trap material, second catalytic trap material and the optional intermediate catalytic trap materials are coated comprises the same carrier member.

16. The catalytic trap of claim 1 wherein the refractive carrier member on which the first catalytic trap material, second catalytic trap material and the optional intermediate catalytic trap materials comprises separate corresponding carrier member segments.

17. The catalytic trap of claim 1 in combination with a treatment catalyst disposed upstream of the catalytic trap relative to the exhaust gas stream, the treatment catalyst being effective at least to promote under oxidation conditions the oxidation of hydrocarbons to $CO_2$ and $H_2O$.

18. The catalytic trap of claim 1 wherein the first catalytic trap material, the second catalytic trap material, the optional intermediate catalytic trap materials and the refractory carrier members are substantially free of silica components.

19. The catalytic trap of claim 18 wherein the carrier members comprise a nonsilica-containing refractory material selected from the group consisting of a refractory metal and one or more of alumina, titania, zirconia, corundum, aluminum phosphate, zirconium phosphate, zirconium aluminum phosphate, metals incorporating zirconium phosphate and metals incorporating zirconium aluminum phosphate.

20. The catalytic trap of claim 19 wherein the refractory metal is selected from the group consisting of stainless steel, iron/chromium alloy, and titanium.

21. The catalytic trap of claim 1 wherein the first zone and/or the second zone and/or the optional intermediate zones further comprise one or more components independently selected from the group consisting of oxides of nickel, manganese, iron, lanthanum, barium and zirconium.

22. The catalytic trap of claim 1 wherein the first catalytic trap material, second catalytic trap material and optional intermediate catalytic trap materials in the first, second and optional intermediate zones, respectively, are present as a discrete bottom layer and a discrete top layer overlying the bottom layer.

23. The catalytic trap of claim 22 wherein the refractive carrier member on which the first catalytic trap material, second catalytic trap material and the optional intermediate catalytic trap materials are coated comprises the same carrier member.

24. The catalytic trap of claim 23 wherein the refractive carrier member on which the first catalytic trap material, second catalytic trap material and the optional intermediate catalytic trap materials are coated comprises separate corresponding carrier member segments.

25. The catalytic trap of claim 22 wherein the first catalytic trap material in the top layer comprises a refractory metal oxide support having dispersed thereon a palladium catalytic component and a $NO_x$ sorbent comprising one or more basic oxygenated compounds of one or more alkaline earth metals and optionally, one or more basic oxygenated compounds of one or more alkali metals, and the first catalytic trap material in the bottom layer comprises a refractory metal oxide support having dispersed thereon a platinum catalytic component, a rhodium catalytic component and a $NO_x$ sorbent comprising one or more basic oxygenated compounds of one or more alkaline earth metals and optionally, one or more basic oxygenated compounds of one or more alkali metals.

26. The catalytic trap of claim 25 wherein the palladium catalytic component in the top layer is present in the amount of 50 to 200 g/ft$^3$; the platinum catalytic component in the bottom layer is present in the amount of 0 to 50 g/ft$^3$; the rhodium catalytic component in the bottom layer is present in the amount of 0 to 10 g/ft$^3$; and the $NO_x$ sorbent is present in each of the top and bottom layers in the amount of 0 to 0.45 g/in$^3$ in the case of the $NO_x$ sorbent being one or more basic oxygenated compounds of one or more alkali metals and in the amount of 0.3 to 1.5 g/in$^3$ in the case of the $NO_x$ sorbent being one or more basic oxygenated compounds of one or more alkaline earth metals.

27. The catalytic trap of claim 22 wherein the first catalytic trap material, the second catalytic trap material, the optional intermediate catalytic trap materials and the refractory carrier members are substantially free of silica components.

28. The catalytic trap of claim 27 wherein the carrier members comprise a nonsilica-containing refractory material selected from the group consisting of a refractory metal and one or more of alumina, titania, zirconia, corundum, aluminum phosphate, zirconium phosphate, zirconium aluminum phosphate, metals incorporating zirconium phosphate and metals incorporating zirconium aluminum phosphate.

29. The catalytic trap of claim 28 wherein the refractory metal is selected from the group consisting of stainless steel, iron/chromium alloy, and titanium.

30. The catalytic trap of claim 22 wherein the bottom layer and/or the top layer each comprise one or further components independently selected from the group consisting of oxides of nickel, manganese, iron, lanthanum, barium and zirconium.

31. The catalytic trap of claim 22 wherein the second catalytic trap material in the top layer comprises a refractory metal oxide support having dispersed thereon a palladium catalytic component, a platinum catalytic component, a rhodium catalytic component and a $NO_x$ sorbent comprising one or more basic oxygenated compounds of one or more metals selected from the group consisting of alkaline earth metals and alkali metals, and the second catalytic trap material in the bottom layer comprises a refractory metal oxide support having dispersed thereon a palladium catalytic component, a platinum catalytic component, a rhodium catalytic component and a $NO_x$ sorbent comprising one or more basic oxygenated compounds of one or more metals selected from the group consisting of alkaline earth metals and alkali metals.

32. The catalytic trap of claim 31 wherein the palladium catalytic component is present in the top layer in the amount of 0 to 50 g/ft$^3$ and is present in the bottom layer in the amount of 0 to 15 g/ft$^3$; the platinum catalytic component is present in the top layer in the amount of 0 to 30 g/ft$^3$ and is present in the bottom layer in the amount of 30 to 90 g/ft$^3$; the rhodium catalytic component is present in the top layer in the amount of 0 to 20 g/ft$^3$ and is present in the bottom layer in the amount of 5 to 10 g/ft$^3$; and the $NO_x$ sorbent is present in each of the top and bottom layers in the amount of 0.25 to 1.0 g/in$^3$ in the case of the $NO_x$ sorbent being one or more basic oxygenated compounds of one or more alkali metals and in the amount of 0.2 to 0.6 g/in$^3$ in the case of the $NO_x$ sorbent being one or more basic oxygenated compounds of one or more alkaline earth metals.

33. The catalytic trap of claim 22 wherein the optional intermediate catalytic trap materials in the top layer comprise a refractory metal oxide support having dispersed thereon a palladium catalytic component, a platinum catalytic component, a rhodium catalytic component and a $NO_x$ sorbent comprising one or more basic oxygenated compounds of one or more metals selected from the group consisting of alkaline earth metals and alkali metals, and the optional intermediate catalytic trap materials in the bottom layer comprise a refractory metal oxide support having dispersed thereon a palladium catalytic component, a platinum catalytic component, a rhodium catalytic component and a $NO_x$ sorbent comprising one or more basic oxygenated compounds of one or more metals selected from the group consisting of alkaline earth metals and alkali metals.

34. The catalytic trap of claim 33 wherein the palladium catalytic component is present in the top layer in the amount of 10 to 30 g/ft$^3$ and is present in the bottom layer in the amount of 0–10 g/ft$^3$; the platinum catalytic component is present in the top layer in the amount of 0 to 30 g/ft$^3$ and is present in the bottom layer in the amount of 10 to 40 g/ft$^3$; the rhodium catalytic component is present in the top layer in the amount of 0 to 10 g/ft$^3$ and is present in the bottom layer in the amount of 5 to 10 g/ft$^3$; and the $NO_x$ sorbent is present in each of the top and bottom layers in the amount of 0.1 to 0.8 g/in$^3$ in the case of the $NO_x$ sorbent being one or more basic oxygenated compounds of one or more alkali metals and in the amount of 0.2 to 0.8 g/in$^3$ in the case of the $NO_x$ sorbent being one or more basic oxygenated compounds of one or more alkaline earth metals.

35. A multi-zoned catalytic trap for conversion of $NO_x$ in an exhaust gas stream which emanates from an engine which is operated with periodic alternations between lean, and stoichiometric or rich, conditions, said multi-zoned catalytic trap comprising a discrete bottom layer coated on a refractive carrier member and a discrete top layer overlying the top layer, said bottom layer comprising a refractory metal oxide support having dispersed thereon a platinum catalytic component and a rhodium catalytic component and optionally a palladium catalytic component; said top layer comprising a refractory metal oxide support having dispersed thereon a palladium catalytic component and optionally a platinum and/or rhodium catalytic component, said multi-zoned catalytic trap further comprising a discrete first zone overlying a corresponding first section of the top layer and a discrete second zone overlying a corresponding second section of the top layer, said discrete first zone comprising a layer of a palladium catalytic component and a $NO_x$ sorbent comprising one or more basic oxygenated compounds of one or more alkaline earth metals and optionally, one or more basic oxygenated compounds of one or more alkali metals superimposed on top of the first section of the top layer and said second zone comprising a layer of a $NO_x$ sorbent comprising one or more basic oxygenated compounds of one or more alkaline earth metals and optionally, one or more basic oxygenated compounds of one or more alkali metals superimposed on top of the second section of the top layer.

36. The catalytic trap of claim 35 wherein the first zone is superimposed on a section of the top layer comprising an area of about 20% to about 80% of the total area of the top layer.

37. The catalytic trap of claim 35 wherein the bottom layer and/or the layer each comprise one or further components independently selected from the group consisting of oxides of nickel, manganese, iron, lanthanum, barium and zirconium.

38. The catalytic trap of claim 35 wherein the palladium catalytic component is present in the top layer in the amount of 0 to about 50 g/ft$^3$ and is present in the bottom layer in the amount of 0 to about 15 g/ft$^3$; the platinum catalytic component is present in the top layer in the amount of 0 to about 30 g/ft$^3$ and is present in the bottom layer in the amount of about 30 to about 90 g/ft$^3$; the rhodium catalytic component is present in the top layer in the amount of 0 to about 20 g/ft$^3$ and is present in the bottom layer in the amount of about 5 to about 10 g/ft$^3$; and the $NO_x$ sorbent is present in each of the top and bottom layers in the amount of about 0.25 to about 1.0 g/in$^3$ in the case of the $NO_x$ sorbent being one or more basic oxygenated compounds of one or more alkali metals and in the amount of about 0.2 to about 0.6 g/in$^3$ in the case of the $NO_x$ sorbent being one or more basic oxygenated compounds of one or more alkaline earth metals.

39. The catalytic trap of claim 38 wherein the palladium catalytic component is present in said first zone in an amount of about 30 to about 150 g/ft$^3$ and the $NO_x$ sorbent is optionally present in the first zone in the amount of about 0.25 to about 1.0 g/in$^3$ in the case of the $NO_x$ sorbent being one or more basic oxygenated compounds of one or more alkali metals and optionally in the amount of about 0.2 to about 0.6 g/in$^3$ in the case of the $NO_x$ sorbent being one or more basic oxygenated compounds of one or more alkaline earth metals.

40. The catalytic trap of claim 39 wherein the $NO_x$ sorbent is present in the second zone in the amount of about 0.25 to about 1.0 g/in$^3$ in the case of the $NO_x$ sorbent being one or more basic oxygenated compounds of one or more alkali metals and in the amount of about 0.2 to about 0.6 g/in$^3$ in the case of the $NO_x$ sorbent being one or more basic oxygenated compounds of one or more alkaline earth metals.

41. The catalytic trap of claim 35 wherein the $NO_x$ sorbent in the bottom and top layers and in the first and second zones is independently selected from the group consisting of one or more basic oxygenated compounds of lithium, sodium, potassium, cesium, magnesium, calcium, strontium and barium.

42. The catalytic trap of claim 41 wherein the $NO_x$ sorbent comprises a basic oxygenated compound of potassium.

43. The catalytic trap of claim 41 wherein the $NO_x$ sorbent comprises a basic oxygenated compound of cesium.

44. The catalytic trap of claim 41 wherein the $NO_x$ sorbent comprises a basic oxygenated compound of barium.

45. The catalytic trap of claim 41 wherein the $NO_x$ sorbent comprises a basic oxygenated compound of strontium.

46. The catalytic trap of claim 41 wherein the $NO_x$ sorbent comprises a basic oxygenated compound of sodium.

47. The catalytic trap of claim 41 wherein the refractive carrier member, the bottom and top layers and the first and second zones are substantially free of silica components.

48. The catalytic trap of claim 47 wherein the carrier member comprises a nonsilica-containing refractory material selected from the group consisting of a refractory metal and one or more of alumina, titania, zirconia, corundum, aluminum phosphate, zirconium phosphate, zirconium aluminum phosphate, metals incorporating zirconium phosphate and metals incorporating zirconium aluminum phosphate.

49. The catalytic trap of claim 48 wherein the refractory metal is selected from the group consisting of stainless steel, iron/chromium alloy, and titanium.

50. The catalytic trap of claim 35 in combination with a treatment catalyst disposed upstream of the catalytic trap relative to the exhaust gas stream, the treatment catalyst being effective at least to promote under oxidation conditions the oxidation of hydrocarbons to $CO_2$ and $H_2O$.

51. A method of treating an engine exhaust gas stream containing $NO_x$ to abate the $NO_x$ content of the stream which comprises maintaining the engine under alternating periods of lean and stoichiometric or rich operation, and contacting the stream during the periods of both lean and stoichiometric or rich operation with the catalytic trap of claim 1, under conditions whereby at least some of the $NO_x$ in the exhaust gas stream is adsorbed by the catalytic trap during the periods of lean operation and is released from the catalytic trap and reduced to nitrogen during the periods of stoichiometric or rich operation.

52. The method of claim 51 wherein the engine exhaust gas stream contains hydrocarbons, further comprising contacting the engine exhaust gas stream under oxidizing conditions with a catalyst effective to promote oxidation of hydrocarbons, whereby the hydrocarbons in the stream are oxidized, prior to contact of the exhaust gas stream with the catalytic trap.

53. The method of claim 51 wherein the temperature of the exhaust gas stream immediately prior to its contact with the catalytic trap is in the range of about 250C. to about 850C.

54. The method of claim 51 wherein the exhaust gas stream enters the catalytic trap through the first zone and exits the catalytic trap through the second zone.

55. The method of claim 51 wherein the exhaust gas stream enters the catalytic trap through the second zone and exits the catalytic trap through the first zone.

56. A method of treating an engine exhaust gas stream containing $NO_x$ to abate the $NO_x$ content of the stream which comprises maintaining the engine under alternating periods of lean and stoichiometric or rich operation, and contacting the stream during the periods of both lean and stoichiometric or rich operation with the catalytic trap of claim 21, under conditions whereby at least some of the $NO_x$ in the exhaust gas stream is adsorbed by the catalytic trap during the periods of lean operation and is released from the catalytic trap and reduced to nitrogen during the periods of stoichiometric or rich operation.

57. The method of claim 56 wherein the engine exhaust gas stream contains hydrocarbons, further comprising contacting the engine exhaust gas stream under oxidizing conditions with a catalyst effective to promote oxidation of hydrocarbons, whereby the hydrocarbons in the stream are oxidized, prior to contact of the exhaust gas stream with the catalytic trap.

58. The method of claim 56 wherein the temperature of the exhaust gas stream immediately prior to its contact with the catalytic trap is in the range of about 250C. to about 850C.

59. The method of claim 56 wherein the exhaust gas stream enters the catalytic trap through the first zone and exits the catalytic trap through the second zone.

60. The method of claim 56 wherein the exhaust gas stream enters the catalytic trap through the second zone and exits the catalytic trap through the first zone.

61. A method of treating an engine exhaust gas stream containing $NO_x$ to abate the $NO_x$ content of the stream which comprises maintaining the engine under alternating periods of lean and stoichiometric or rich operation, and contacting the stream during the periods of both lean and stoichiometric or rich operation with the catalytic trap of claim 31, under conditions whereby at least some of the $NO_x$ in the exhaust gas stream is adsorbed by the catalytic trap during the periods of lean operation and is released from the catalytic trap and reduced to nitrogen during the periods of stoichiometric or rich operation.

62. The method of claim 61 wherein the engine exhaust gas stream contains hydrocarbons, further comprising contacting the engine exhaust gas stream under oxidizing conditions with a catalyst effective to promote oxidation of hydrocarbons, whereby the hydrocarbons in the stream are oxidized, prior to contact of the exhaust gas stream with the catalytic trap.

63. The method of claim 61 wherein the temperature of the exhaust gas stream immediately prior to its contact with the catalytic trap is in the range of about 250C. to about 850C.

64. The method of claim 61 wherein the exhaust gas stream enters the catalytic trap through the first zone and exits the catalytic trap through the second zone.

65. The method of claim 61 wherein the exhaust gas stream enters the catalytic trap through the second zone and exits the catalytic trap through the first zone.

66. A method of manufacturing a multi-zoned catalytic trap for conversion of $NO_x$ in an exhaust gas stream which emanates from an engine which is operated with periodic alternations between lean, and stoichiometric or rich conditions, said catalytic trap comprising a first zone, a second zone and, optionally, one or more intermediate zone disposed between the first zone and the second zone, said first zone comprising a first catalytic trap material coated on a refractory carrier member, said second zone comprising a second catalytic trap material coated on a refractory carrier member and said optional intermediate zones comprising one or more optional intermediate catalytic trap materials coated on one or more refractory carrier members, which comprises the steps of:

(A) preparing the first catalytic trap material by dispersing onto a refractory metal oxide support a palladium catalytic component in the amount of about 30 to about 300 g/ft$^3$, a platinum catalytic component in the amount of 0 to about 100 g/ft$^3$ and a rhodium catalytic component in the amount of 0 to about 10 g/ft$^3$ and a $NO_x$ sorbent comprising one or more basic oxygenated compounds of one or more alkaline earth metals and optionally one or more basic oxygenated compounds of one or more alkali metals by impregnating the support with a solution of a precursor palladium compound, a precursor platinum compound, a precursor rhodium compound and a precursor $NO_x$ sorbent compound in a liquid vehicle;

(B) coating the impregnated support resulting from step (A) onto a refractory carrier member;

(C) drying and thereafter heating the coated refractory carrier member resulting from step (B);

(D) preparing the second catalytic trap material by dispersing onto a refractory metal oxide support a palladium catalytic component in the amount of 0 to about 50 g/ft$^3$, a platinum catalytic component in the amount of about 10 to about 100 g/ft$^3$ and a rhodium catalytic component in the amount of about 5 to about 20 g/ft$^3$ and a $NO_x$ sorbent comprising one or more basic oxygenated compounds of one or more metals selected from the group consisting of alkaline earth metals and alkali metals by impregnating the support with a solution of a precursor palladium compound, a precursor platinum compound, a precursor rhodium compound and a precursor $NO_x$ sorbent compound in a liquid vehicle;

(E) coating the impregnated support resulting from step (D) onto a refractory carrier member;

(F) drying and thereafter heating the coated refractory carrier member resulting from step (E);

(G) preparing the optional intermediate catalytic trap materials by dispersing onto a refractory metal oxide support a palladium catalytic component in the amount of 25 to about 75 g/ft$^3$, a platinum catalytic component in the amount of about 5 to about 30 g/ft$^3$ and a rhodium catalytic component in the amount of 0 to about 10 g/ft$^3$ and a $NO_x$ sorbent comprising one or more basic oxygenated compounds of one or more metals selected from the group consisting of alkaline earth metals and alkali metals by impregnating the support with a solution of a precursor palladium compound, a precursor platinum compound, a precursor rhodium compound and a precursor $NO_x$ sorbent compound in a liquid vehicle;

(H) coating the optional impregnated support resulting from step (G) onto one or more refractory carrier members; and (I) drying and thereafter heating the one or more coated refractory carrier members resulting from step (I).

67. The method of claim 66 wherein the refractive carrier member employed in steps (B), (E) and (H) comprises the same carrier member.

68. The method of claim 66 wherein the refractive carrier member employed in steps (B), (E) and (H) comprises corresponding separate carrier member segments.

69. The method of claim 66 wherein the multi-zoned catalytic trap is prepared in the form of layers by the steps of:

(1) coating the first, second and optional intermediate catalytic trap materials onto a refractory carrier member;

(2) drying and heating the resultant coated carrier member to provide a bottom layer of the first, second and optional intermediate catalytic washcoats; and (3) providing a top layer overlying the bottom layer, said top layer being prepared by coating the first, second and optional intermediate catalytic trap materials onto the refractory carrier member resulting from step (2) and thereafter drying and heating the resultant coated carrier member to provide a top layer of the first, second and optional intermediate catalytic washcoats.

70. The method of claim 69 wherein the refractive carrier member employed in step (1) comprises the same carrier member.

71. The method of claim 69 wherein the refractive carrier member employed in step (1), comprises corresponding separate carrier member segments.

72. A method of manufacturing a multi-zoned catalytic trap for conversion of $NO_x$ in an exhaust gas stream which emanates from an engine which is operated with periodic alternations between lean, and stoichiometric or rich conditions, said multi-zoned catalytic trap being present in the form of a discrete bottom layer coated on a refractive carrier member and a discrete top layer overlying the top layer, said bottom layer comprising a refractory metal oxide support having dispersed thereon a platinum catalytic component and a rhodium catalytic component and optionally a palladium catalytic component and a $NO_x$ sorbent, said top layer comprising a refractory metal oxide support having dispersed thereon a palladium catalytic component and optionally a platinum and/or rhodium catalytic component and a $NO_x$ sorbent, said multi-zoned catalytic trap further comprising a discrete first zone and a discrete second zone, said first zone comprising a layer of a palladium catalytic component and a $NO_x$ sorbent superimposed on a corresponding first section of the top layer and said second zone comprising a layer of a $NO_x$ sorbent superimposed on top of a corresponding second section of the top layer, which comprises the steps of:

(1) dispersing onto a refractory metal oxide support a platinum catalytic component and a rhodium catalytic component and optionally a palladium catalytic component and a $NO_x$ sorbent comprising one or more basic oxygenated compounds of one or more alkaline earth metals and optionally, one or more basic oxygenated compounds of one or more alkali metals by impregnating the support with a solution of a precursor platinum compound, a precursor rhodium compound and optionally a precursor platinum compound and a precursor $NO_x$ sorbent compound in a liquid vehicle;

(2) coating the impregnated support resulting from step (1) onto a refractory carrier member;

(3) drying and thereafter heating the refractory carrier member resulting from step (2) to provide a refractory carrier member containing a bottom layer of a coating of the platinum catalytic component, the rhodium catalytic component, the optional palladium catalytic component and the $NO_x$ sorbent;

(4) dispersing onto a refractory metal oxide support a palladium catalytic component and optionally a platinum and/or rhodium catalytic component, and a $NO_x$ sorbent comprising one or more basic oxygenated compounds of one or more alkaline earth metals and optionally, one or more basic oxygenated compounds of one or more alkali metals by impregnating the support with a solution of a precursor palladium compound and optionally a precursor platinum and/or precursor rhodium compound and a precursor $NO_x$ sorbent compound in a liquid vehicle;

(5) coating the impregnated support resulting from step (4) onto the bottom layer of the coated refractory member resulting from step (3);

(6) drying and thereafter heating the refractory carrier member resulting from step (5) to provide a refractory carrier member containing a top layer of the palladium catalytic component, the optional platinum and/or rhodium catalytic component and the $NO_x$ sorbent overlying said bottom layer;

(7) post-impregnating the discrete first zone of the layered refractory carrier member resulting from step (6) with a solution of a precursor palladium compound and a precursor of a $NO_x$ sorbent comprising one or more basic oxygenated compounds of one or more alkaline earth metals and optionally, one or more basic oxygenated compounds of one or more alkali metals in a liquid vehicle;

(8) post-impregnating the discrete second zone of the layered refractory carrier member resulting from step (6) with a solution of a precursor of a $NO_x$ sorbent comprising one or more basic oxygenated compounds of one or more alkaline earth metals and optionally, one or more basic oxygenated compounds of one or more alkali metals in a liquid vehicle; and (9) drying and heating the post-impregnated layered refractive carrier member resulting from step (8).

73. The method of claim 72 wherein the palladium catalytic component is present in the top layer in the amount of 0 to about 50 g/ft$^3$ and is present in the bottom layer in the amount of 0 to about 15 g/ft$^3$; the platinum component is present in the top layer in the amount of 0 to about 30 g/ft$^3$ and is present in the bottom layer in the amount of about 30 to about 90 g/ft$^3$; the rhodium catalytic component is present in the top layer in the amount of 0 to about 20 g/ft$^3$ and is present in the bottom layer in the amount of about 5 to about 10 g/ft$^3$; and the $NO_x$ sorbent is present in each of the top and bottom layers in the amount of 0.25 to 1.0 g/in$^3$ in the case of the $NO_x$ sorbent being one or more basic oxygenated compounds of one or more alkali metals and in the amount of 0.2 to 0.6 g/in$^3$ in the case of the $NO_x$ sorbent being one or more basic oxygenated compounds of one or more alkaline earth metals.

74. The method of claim 72 wherein the palladium catalytic component is present in the first zone in the amount of about 30 to about 150 g/ft$^3$ and the $NO_x$ sorbent is optionally present in the first zone in the amount of about 0.25 to about 1.0 g/in$^3$ in the case of the $NO_x$ sorbent being one or more basic oxygenated compounds of one or more alkali metals and optionally in the amount of about 0.2 to about 0.6 g/in$^3$ in the case of the $NO_x$ sorbent being one or more basic oxygenated compounds of one ore more alkaline earth metals.

75. The method of claim 74 wherein the $NO_x$ sorbent is present in the second zone in the amount of about 0.25 to about 1.0 g/in$^3$ in the case of the $NO_x$ sorbent being one or more basic oxygenated compounds of one or more alkali metals and in the amount of about 0.2 to about 0.6 g/in$^3$ in the case of the $NO_x$ sorbent being one or more basic oxygenated compounds of one ore more alkaline earth metals.

76. The method of claim 72 wherein the first zone is superimposed on a section of the top layer comprising an area of about 20% to about 80% of the total area of the top layer.

* * * * *